(12) United States Patent
Lomet et al.

(10) Patent No.: US 9,003,162 B2
(45) Date of Patent: Apr. 7, 2015

(54) STRUCTURING STORAGE BASED ON LATCH-FREE B-TREES

(75) Inventors: David Lomet, Redmond, WA (US);
Justin Levandoski, Seattle, WA (US);
Sudipta Sengupta, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 62 days.

(21) Appl. No.: 13/527,880

(22) Filed: Jun. 20, 2012

(65) Prior Publication Data

US 2013/0346725 A1    Dec. 26, 2013

(51) Int. Cl.
*G06F 12/10*    (2006.01)

(52) U.S. Cl.
CPC ......... *G06F 12/10* (2013.01); *Y10S 707/99951* (2013.01)

(58) Field of Classification Search
CPC ...................................................... G06F 12/10
USPC .................. 711/114, 118, 206, 154, E12.061; 707/999.2; 717/120
See application file for complete search history.

(56) References Cited

U.S. PATENT DOCUMENTS

| | | |
|---|---|---|
| 4,945,474 A | 7/1990 | Elliott et al. |
| 5,043,866 A | 8/1991 | Myre et al. |
| 5,123,104 A | 6/1992 | Levine et al. |
| 5,212,788 A | 5/1993 | Lomet et al. |
| 5,247,672 A | 9/1993 | Mohan |
| 5,317,731 A | 5/1994 | Dias et al. |
| 5,335,343 A | 8/1994 | Lampson et al. |
| 5,440,727 A | 8/1995 | Bhide et al. |
| 5,781,910 A | 7/1998 | Gostanian et al. |
| 5,845,292 A | 12/1998 | Bohannon et al. |
| 5,870,758 A | 2/1999 | Bamford et al. |
| 5,870,763 A | 2/1999 | Lomet |
| 5,966,706 A | 10/1999 | Biliris et al. |
| 6,085,200 A | 7/2000 | Hill et al. |

(Continued)

FOREIGN PATENT DOCUMENTS

EP    0465018 B1    5/1997

OTHER PUBLICATIONS

Natasha Saldanha et al, "Implementation of PALM: Parallel Architecture-Friendly Latch-Free Modifications to B+ Trees on Many-Core Processors", May 8, 2012, pp. 1-8.*

(Continued)

*Primary Examiner* — Mardochee Chery
*Assistant Examiner* — Kamal K Dewan
(74) *Attorney, Agent, or Firm* — Judy Yee; Micky Minhas

(57) ABSTRACT

A request to modify an object in storage that is associated with one or more computing devices may be obtained, the storage organized based on a latch-free B-tree structure. A storage address of the object may be determined, based on accessing a mapping table that includes map indicators mapping logical object identifiers to physical storage addresses. A prepending of a first delta record to a prior object state of the object may be initiated, the first delta record indicating an object modification associated with the obtained request. Installation of a first state change associated with the object modification may be initiated via a first atomic operation on a mapping table entry that indicates the prior object state of the object. For example, the latch-free B-tree structure may include a B-tree like index structure over records as the objects, and logical page identifiers as the logical object identifiers.

20 Claims, 16 Drawing Sheets

(56) References Cited

U.S. PATENT DOCUMENTS

| | | | |
|---|---|---|---|
| 6,185,699 B1 | 2/2001 | Haderle et al. | |
| 6,282,605 B1* | 8/2001 | Moore | 711/103 |
| 6,581,132 B1* | 6/2003 | Kakinuma et al. | 711/103 |
| 6,978,279 B1 | 12/2005 | Lomet et al. | |
| 7,039,773 B2 | 5/2006 | Hu et al. | |
| 7,065,537 B2 | 6/2006 | Cha et al. | |
| 7,293,028 B2 | 11/2007 | Cha et al. | |
| 7,305,421 B2 | 12/2007 | Cha et al. | |
| 7,426,559 B2 | 9/2008 | Hamel et al. | |
| 7,472,139 B2 | 12/2008 | Nishikawa et al. | |
| 7,747,589 B2 | 6/2010 | Lomet | |
| 7,962,693 B1 | 6/2011 | Bumbulis | |
| 8,019,938 B2 | 9/2011 | Flynn et al. | |
| 8,150,893 B2 | 4/2012 | Bohannon et al. | |
| 8,165,988 B2 | 4/2012 | Shau et al. | |
| 8,170,997 B2 | 5/2012 | Lomet et al. | |
| 8,244,667 B1 | 8/2012 | Weinberger et al. | |
| 8,589,341 B2 | 11/2013 | Golde et al. | |
| 8,868,514 B2 | 10/2014 | Lomet et al. | |
| 2002/0138446 A1 | 9/2002 | Antonin et al. | |
| 2003/0061537 A1 | 3/2003 | Cha et al. | |
| 2003/0208464 A1 | 11/2003 | Lee et al. | |
| 2004/0260726 A1 | 12/2004 | Hrle et al. | |
| 2006/0004839 A1 | 1/2006 | Nagasawa et al. | |
| 2006/0167960 A1 | 7/2006 | Lomet | |
| 2006/0253502 A1 | 11/2006 | Raman et al. | |
| 2007/0011105 A1 | 1/2007 | Benson et al. | |
| 2007/0112885 A1 | 5/2007 | Farr | |
| 2007/0239758 A1 | 10/2007 | Devine et al. | |
| 2007/0282848 A1 | 12/2007 | Kiilerich et al. | |
| 2008/0065670 A1* | 3/2008 | Cha et al. | 707/101 |
| 2009/0240664 A1 | 9/2009 | Dinker et al. | |
| 2010/0030818 A1 | 2/2010 | Cooper et al. | |
| 2010/0191713 A1 | 7/2010 | Lomet et al. | |
| 2010/0191919 A1* | 7/2010 | Bernstein et al. | 711/141 |
| 2011/0179000 A1 | 7/2011 | Shaughnessy | |
| 2011/0252000 A1 | 10/2011 | Diaconu et al. | |
| 2012/0005168 A1 | 1/2012 | Lomet et al. | |
| 2012/0210021 A1* | 8/2012 | Flynn et al. | 710/5 |
| 2013/0110767 A1 | 5/2013 | Tatemura et al. | |
| 2013/0339312 A1 | 12/2013 | Schreter | |
| 2014/0149527 A1 | 5/2014 | Lee et al. | |

OTHER PUBLICATIONS

Thomas Kissinger et al, KISS-Tree: Smart Latch-Free In-Memory Indexing on Modern Architectures, Proceedings of the Eighth International Workshop on Data Management on New Hardware, May 21, 2012, pp. 16-23.*

Cha, et al., "Cache-Conscious Concurrency Control of Main-Memory Indexes on Shared-Memory Multiprocessor Systems," Retrieved May 11, 2012 at <<http://www.vldb.org/conf/2001/P181.pdf>>, In Proceedings of the VLDB Endowment (VLDB '01), 2001, pp. 181-190.

Johnson, et al., "Scalability of write-ahead logging on multicore and multisocket hardware," Retrieved May 11, 2012 at <<http://infoscience.epfl.ch/record/170505/files/aether-smpfulltext.pdf>>, In Proceedings of the VLDB Endowment (VLDB '12), Dec. 2011, pp. 239-263.

Holloway, Allison L., "Adapting Database Storage for New Hardware," Retrieved May 11, 2012 at <<http://pages.cs.wisc.edu/~ahollowa/main.pdf>>, University of Wisconsin at Madison, Madison, WI, 2009, 146 pages.

Athanassoulis, et al., "MaSM: Efficient Online Updates in Data Warehouses," Retrieved May 11, 2012 at <<http://www.cs.cmu.edu/afs/cs.cmu.edu/Web/People/chensm/papers/MaSM-sigmod11.pdf>>, In Proceedings of the 2011 international conference on Management of Data (SIGMOD '11), Jun. 2011, pp. 865-876.

Rashid, Layali, "Exploiting Multithreaded Architectures to Improve Data Management Operations," Retrieved May 11, 2012 at <<http://blogs.ubc.ca/lrashid/files/2011/01/layali_msc_thesis.pdf>>, University of Calgary, 2007, 117 pages.

Mao, et al., "Cache Craftiness for Fast Multicore Key-Value Storage," Retrieved May 11, 2012 at <<http://www.read.seas.harvard.edu/~kohler/pubs/mao12cache.pdf>>, In Proceedings of the 7th ACM European Conference on Computer Systems (EuroSys '12), Apr. 10-13, 2012, pp. 183-196.

Ailamaki, et al., "DBMSs on a Modern Processor: Where Does Time Go?", Retrieved May 10, 2012 at <<http://www.cs.uwaterloo.ca/~brecht/courses/702/Possible-Readings/workloads/DBMS-stalls-vldb99_paper.pdf>>, In Proceedings of the 25th International Conference on Very Large Data Bases (1999), pp. 266-277.

Bayer, et al., "Organization and Maintenance of Large Ordered Indices," Retrieved Jun. 14, 2012 at <<http:///www.minet.uni-jena.de/dbis/lehre/ws2005/dbs1/Bayer_hist.pdf>>, Acta Informatica, vol. 1, No. 1 (1972), pp. 173-189.

Bayer, et al., "Prefix B-Trees," Retrieved May 10, 2012 at <<http://ict.pue.udlap.mx/people/carlos/is215/papers/p11-bayer.pdf>>,In ACM Transaction on Database Systems (TODS), vol. 2, Issue 1 (1977), pp. 11-26.

Bernstein, et al., "Hyder—A Transactional Record Manager for Shared Flash," Retrieved May 10, 2012 at <<http://www.systems.ethz.ch/education/fs11/hotDMS/papers/cidr11_hyder.pdf>>, In 5th Biennial Conference on Innovative Data Systems Research (Jan. 2011), pp. 9-20.

Chen, et al., "Fractal Prefetching B±Trees: Optimizing Both Cache and Disk Performance," Retrieved May 10, 2012 at <<http://www.cs.cmu.edu/afs/cs.cmu.edu/Web/People/chensm/papers/fpbtree.pdf>>, In Proceedings of the ACM SIGMOD International Conference on Management of Data (2002), pp. 157-168.

Comer, Douglas, "The Ubiquitous B-Tree," Retrieved May 10, 2012 at <<http://people.cs.aau.dk/~simas/aalg06/UbiquitBtree.pdf>>, In ACM Computing Surveys, vol. 11, No. 2 (1979), pp. 121-137.

Debnath, et al., "FlashStore: High Throughput Persistent Key-Value Store," Retrieved May 10, 2012 at <<http://www.vldb.org/pvldb/vldb2010/papers/l04.pdf>>, In Proceedings of the VLDB Endowment, vol. 3, No. 2 (2010), pp. 1414-1425.

Debnath, et al., "SkimpyStash: RAM Space Skimpy Key-Value Store on Flash-based Storage," Retrieved May 10, 2012 at <<http://202.114.89.42/resource/pdf/6536.pdf>>, In Proceedings of the 2011 International Conference on Management of Data (Jun. 2011), pp. 25-36.

"Amazon DynamoDB," Retrieved May 10, 2012 at <<http://aws.amazon.com/dynamodb/>>, 15 pages.

Hu, et al., "Write Amplification Analysis in Flash-Based Solid State Drives," Retrieved May 10, 2012 at <<http://ec.eurecom.fr/~pletka/publications/write-ampl.pdf>>, In Proceedings of the Israeli Experimental Systems Conference (SYSTOR '09), 2009, pp. 1-9.

Lee, et al., "Design of Flash-Based DBMS: An In-Page Logging Approach," Retrieved May 10, 2012 at <<https://cs.arizona.edu/~bkmoon/papers/sigmod07.pdf>>, In Proceedings of the ACM SIGMOD International Conference on Management of Data (2007), pp. 55-66.

Lehman, et al., "Efficient Locking for Concurrent Operations on B-Trees," Retrieved May 10, 2012 at <<http://www.cs.cornell.edu/courses/CS4411/2009sp/blink.pdf>>, In ACM Transactions on Database Systems, vol. 6, No. 4 (1981), pp. 650-670.

Levandoski, et al., "Deuteronomy: Transaction Support for Cloud Data," Retrieved May 10, 2012 at <<http://research.microsoft.com/pubs/152654/Deut-TC.pdf>>, In Proceedings of the Fifth Biennial Conference on Innovative Data Systems Research (CIDR), Jan. 2011, pp. 123-133.

Lomet, David, "The Evolution of Effective B-tree Page Organization and Techniques: A Personal Account," Retrieved May 10, 2012 at <<http://www.cs.duke.edu/courses/spring03/cps216/papers/lomet-2001.pdf, In ACM SIGMOD Record (2001), vol. 30, Issue 3, pp. 64-69.

Lomet, et al., "Implementing Performance Competitive Logical Recovery," Retrieved May 10, 2012 at <<http://arxiv.org/ftp/arxiv/papers/1105/1105.4253.pdf>>, In Proceedings of the VLDB Endowment, vol. 4, No. 7, Aug. 2011, pp. 430-439.

Michael, Maged M., "Hazard Pointers: Safe Memory Reclamation for Lock-Free Objects," Retrieved May 10, 2012 at <<http://

(56) References Cited

OTHER PUBLICATIONS ieeexplore.ieee.org/stamp/stamp.jsp?tp=&arnumber=1291819>>, In IEEE Transactions on Parallel and Distributed Systems, vol. 15, No. 6 (2004), pp. 491-504.

"MongoDB," Retrieved May 10, 2012 at <<http://www.mongodb.org/>>.

Nyberg, et al., "AlphaSort: A Cache-Sensitive Parallel External Sort," Retrieved May 10, 2012 at <<http://users.xfce.org/~benny/files/AlphaSort.pdf>>, In the VLDB Journal—The International Journal on Very Large Data Bases, vol. 4, Issue 4 (1995), pp. 603-627.

Pandis, et al., "PLP: Page Latch-free Shared-everything OLTP," Retrieved May 10, 2012 at <<http://pandis.net/resources/pvldb11pandis.pdf>>, In Proceedings of the VLDB Endowment, vol. 4, No. 10 (Aug. 2011), pp. 610-621.

Pugh, William, "Skip Lists: A Probabilistic Alternative to Balanced Trees," Retrieved May 10, 2012 at <<http://citeseerx.ist.psu.edu/viewdoc/download?doi=10.1.1.85.9211&rep=rep1&type=pdf>>, Communications of the ACM, vol. 33, No. 6 (1990), pp. 668-676.

Roh, et al., "B+-tree Index Optimization by Exploiting Internal Parallelism of Flash-based Solid State Drives," Retrieved May 11, 2012 at <<http://vldb.org/pvldb/vol5/p286_hongchanroh_vldb2012.pdf>>, In 38th International Conference on Very Large Data Bases, vol. 5, No. 4 (Aug. 2012), pp. 286-297.

Rosenblum, et al., "The Design and Implementation of a Log-Structured File System," Retrieved May 11, 2012 at <<http://charlotte.ucsd.edu/classes/sp03/cse121/lfs.pdf>>, ACM Transactions on Computer Systems, vol. 10, No. 1 (1992), pp. 26-52.

Sewall, et al., "PALM: Parallel Architecture-Friendly Latch-Free Modifications to B+ Trees on Many-Core Processors," Retrieved May 11, 2012 at <<http://www.vldb.org/pvldb/vol4/p795-sewall.pdf>>, In Proceedings of the 37th International Conference on Very Large Data Bases (VLDB), vol. 4, No. 11 (Aug. 2011), pp. 795-806.

Wu, et al., "An Efficient B-tree Layer Implementation for Flash-Memory Storage Systems," Retrieved May 11, 2012 at <<http://citeseerx.ist.psu.edu/viewdoc/download?doi=10.1.1.160.3814&rep=rep1&type=pdf>>, In ACM Transactions on Embedded Computing Systems, vol. 6, No. 3 (2007), 23 pages.

Kung, et al., "Concurrent Manipulation of Binary Search Trees," ACM Transactions on Database Systems, vol. 5, No. 3 (Sep. 1980), pp. 354-382.

"Merge Operator", Retrieved on: Jun. 3, 2014, Available at: https://github.com/facebook/rocksdb/wiki/Merge-Operator, 10 pages.

Callaghan, Mark, "Types of writes", Published on: Apr. 17, 2014, Available at: http://smalldatum.blogspot.in/2014/04/types-of-writes.html, 3 pages.

Prohaska, Rich, "Fast Updates with TokuDB", Published on: Feb. 12, 2013, Available at: http://www.tokutek.com/2013/02/fast-updates-with-tokudb/, 2 pages.

Astrahan, et al., "System R: Relational Approach to Database Management", Retrieved Feb. 26, 2013 at <<http://data1.org/download.php?id=3031>>, In Journal ACM Transactions on Database Systems, vol. 1, Issue 2, Jun. 1976, pp. 97-137.

Batory, et al., "GENESIS: An Extensible Database Management System", Retrieved Feb. 22, 2013 at <<http://ieeexplore.ieee.org/stamp/stamp.jsp?tp=&arnumber=9057>>, In IEEE Transactions on Software Engineering, vol. 14, No. 11, Nov. 1988, pp. 1711-1730.

Effelsberg, et al., "Principles of Database Buffer Management", Retrieved Feb. 22, 2013 at <<http://users.informatik.uni-halle.de/~hinnebur/Lehre/Web_DBIIb/uebung3_p560-effelsberg.pdf>>, In ACM Transactions on Database Systems, vol. 9, No. 4, Dec. 1984, pp. 560-595.

Harizopoulos, et al., "OLTP Through the Looking Glass, and What We Found There", Retrieved Feb. 22, 2013 at <<http://nms.csail.mit.edu/~stavros/pubs/OLTP_sigmod08.pdf>>, In Proceedings of the ACM SIGMOD International Conference on Management of Data (SIGMOD'08), Jun. 9, 2008, 12 pages.

Lomet, David B., "Grow and Post Index Trees: Roles, Techniques and Future Potential", Retrieved Feb. 26, 2013 at <<http://www.google.co.in/url?sa=t&rct=j&q=grow%20and%20post%20index%20trees%3A%20roles%2C%20techniques%20and%20future%20potential&source=web&cd=1&cad=rja&ved=0CC4QFjAA&url>>, In Proceedings of the Second International Symposium on Advances in Spatial Databases, Aug. 1991, 24 pages.

Lomet, David B., "The Case for Log Structuring in Database Systems", Retrieved Feb. 22, 2013 at <<http://citeseerx.ist.psu.edu/viewdoc/download?doi=10.1.1.9.2604&rep=rep1&type=pdf>>, In Proceedings International Workshop on High Performance Transaction Systems, Sep. 1995, 5 pages.

"MemSQL Indexes", Retrieved Feb. 21, 2013 at <<http://developers.memsql.com/docs/1b/indexes.html>>, MemSQL documentation, Feb. 21, 2013, 1 page.

O'Neil, et al., "The Log-Structured Merge-Tree (LSM-Tree)", Retrieved Feb. 22, 2013 at <<http://citeseerx.ist.psu.edu/viewdoc/download?doi=10.1.1.44.2782&rep=rep1&type=pdf>>, In Acta Informatica, vol. 33, Issue 4, Jun. 1996, 32 pages.

O'Neil, et al., "The LRU-K Page Replacement Algorithm for Database Disk Buffering", Retrieved Feb. 22, 2013 at <<http://www-2.cs.cmu.edu/~christos/courses/721-resources/p297-o_neil.pdf>>, In Proceedings of the ACM SIGMOD International Conference on Management of Data (SIGMOD), Jun. 1, 1993, pp. 297-306.

"Project Voldermont", Retrieved Feb. 21, 2013 at <<http://www.project-voldemort.com/voldemort/>>, Project Voldermont, Feb. 21, 2013, 1 page.

Thomson, et al., "Calvin: Fast Distributed Transactions for Partitioned Database Systems", Retrieved Feb. 22, 2013 at <<http://cs.yale.edu/homes/thomson/publications/calvin-sigmod12.pdf>>, In Proceedings of the ACM SIGMOD International Conference on Management of Data (SIGMOD '12), May 20, 2012, 12 pages.

"Wikipedia: (CRUD)", Retrieved Feb. 22, 2013 at <<http://en.wikipedia.org/wiki/Create,_read,_update_and_delete>>, Wikipedia, Feb. 22, 2013, 2 pages.

"Xbox Live", Retrieved Feb. 22, 2013 at <<http://www.xbox.com/live>>, Xbox.com, Feb. 22, 2013, 3 pages.

Ewbank, Kay, "A Better B-Tree in Hekaton", Retrieved Feb. 21, 2013 at <<http://www.i-programmer.info/news/84/5239.html>>, I Programmer, Dec. 24, 2012, 4 pages.

Graefe, Goetz, "Write-Optimized B-Trees", Retrieved Feb. 21, 2013 at <<http://www.vldb.org/conf/2004/RS18P2.PDF>>, In Proceedings of the Thirtieth international Conference on Very Large Data Bases (VLDB), vol. 40, Aug. 31, 2004, pp. 672-683.

Kissinger, et al., "KISS-Tree: Smart Latch-Free In-Memory Indexing on Modern Architectures", Retrieved Feb. 21, 2013 at <<http://fusion.hpl.hp.com/damon2012/proceedings/damon12-p16.pdf>>, In Proceedings of the Eighth International Workshop on Data Management on New Hardware (DaMoN 2012), May 21, 2012, pp. 16-23.

Pandis, Ippokratis, "Scalable Transaction Processing through Data-oriented Execution", Retrieved Feb. 21, 2013 at <<http://www.ece.cmu.edu/research/publications/2012/CMU-ECE-2012-009.pdf>>, Submitted in Partial Fulfillment of the Requirements for the Degree of Doctor of Philosophy in Electrical and Computer Engineering, Carnegie Mellon University, May 2011, 227 pages. (**uploaded in EFS in two parts due to file size).

Kissinger, et al., "QPPT: Query Processing on Prefix Trees", Retrieved Feb. 21, 2013 at <<http://www.cidrdb.org/cidr2013/Papers/CIDR13_Paper3.pdf>>, In Proceedings of 6th Biennial Conference on Innovative Data Systems Research (CIDR'13), Jan. 6, 2013, 11 pages.

Sears, et al., "bLSM: A General Purpose Log Structured Merge Tree," Proceedings of the 2012 ACM SIGMOD International Conference on Management of Data (SIGMOD '12), May 20, 2012, pp. 217-228.

"NoSQL," Retrieved Sep. 18, 2013 at <<http://en.wikipedia.org/wiki/NoSQL>>, Wikipedia, Sep. 18, 2013, 8 pages.

"OpenVMS Record Management Services Reference Manual," Retrieved Sep. 18, 2013 at <<http://www.itec.suny.edu/scsys/vms/vmsdoc/72final/4523/4523pro.html#introduction_to_vms_rms>>, Compaq Computer Corporation, 1999, 9 pages.

Barga, et al., "Improving Logging and Recovery Performance in Phoenix/App—Published Date: 2004", Retrieved at <<http://citeseerx.ist.psu.edu/viewdoc/download;jsessionid=FBA3928EB4FE8C007A31816069BDFAOD?doi=1 0.1.1. 72. 140&rep=rep1 &type= pdf>>, Proceedings of the 20th International Conference on Data Engineering, 2004, pp. 12.

(56) References Cited

OTHER PUBLICATIONS

Aguilera, et al., "Sinfonia: A New Paradigm for Building Scalable Distributed Systems", Retrieved at <<http://www.hpl.hp.com/personai!Mehui_Shah/papers/sosp_2007_aguilera.pdf>>,SOSP, Oct. 14-17, 2007, pp. 16.

"Amazon SimpleDB", Retrieved at <<http://aws.amazon.com/simpledb/>>,Retrieved Date: Sep. 23, 2010, pp. 7.

Barga, et al., "Recovery Guarantees for Internet Applications", Retrieved at <<http://citeseerx.ist.psu.edu/viewdoc/download?doi=1 0.1.1.6.450&rep=rep1 &type= pdf>>, ACM Transactions on Internet Technology, vol. 4 No. 3, Aug. 2004, p. 1-42.

Hamilton, James, "Perspectives", Retrieved at<<http:I/perspectives.mvdirona.com/2008/07/10/GoogleMegastore.aspx>>, Jul. 10, 2008, pp. 5.

Brantner, et al., "Building a Database on S3", Retrieved at <<http://citeseerx.ist.psu.edu/viewdoc/download?doi=1 0.1.1.141.5679&rep=rep1&type=pdf>>, International Conference on Management of Data, Jun. 9-12, 2008, p. 251-263.

Brewer, Dr. Eric A., "Towards Robust Distributed Systems, Retrieved at <<http://www.cs.berkeley.edu/-brewer/cs262b-2004/PODC-keynote.pdf>>,Jul. 19, 2000, pp. 12.

Chang, et al., "Bigtable: A Distributed Storage System for Structured Data", Retrieved at <<http://static.googleusercontent. com/ external_contenUuntrusted_dlcp/labs.google .com/en//papers/bigtable-osdi06. pdf>>, In Proceedings of the 7th Conference on Usenix Symposium on Operating Systems Design and Implemenation, vol. 7, 2006, p. 1-14.

Cooper, et al., "PNUTS: Yahoo!'s hosted Data Serving Platform", Retrieved at <<http://citeseerx.ist.psu.edu/viewdoc/download-?doi=10.1.1.141.68&rep=rep1&type=pdf>>, VLDB, Aug. 24-30, 2008, pp. 12.

Das, et al., "EiasTraS: An Elastic Transactional Data Store in the Cloud", Retrieved at<< http://www.usenix.org/event/hotcloud09/tech/full_papers/das.pdf >>, Proceedings of the conference on Hot topics in cloud computing, 2009, pp. 5.

Das, et al., "G-Store: A Scalable Data Store for Transactional Multi-Key Access in the Cloud", Retrieved at<< http://www.cs.ucsb.edu/-sudipto/papers/socc10-das.pdf >>, Workshop on Cloud Computing in conjunction with SIGMOD, Jun. 10-11, 2010, pp. 12.

DeCandia, et al., "Dynamo: Amazon's Highly Available Key-value Store", Retrieved at<< http://s3.amazonaws.com/AllThingsDistributed/sosp/amazon-dynamo-sosp2007.pdf >>,21st Symposium on Operating Systems Principles, Oct. 14-17, 2007, p. 205-220.

Gilbert, et al., "Brewer's Conjecture and the Feasibility of Consistent, Available, Partition-tolerant Web Services", Retrieved at << http://citeseerx.ist.psu.edu/viewdoc/download?doi= 10.1.1.67.6951 &rep=rep1 &type= pdf, ACM SIGACT News, vol. 33 No. 2, Jun. 2002, pp. 12.

"Hbase", Retrieved at<< http://hbase.apache.org/ >>, Aug. 13, 2010, pp. 3.

Kossmann, et al., "An Evaluation of Alternative Architectures for Transaction Processing in the Cloud", Retrieved at << http://citeseerx.ist.psu.edu/viewdoc/download?doi=1 0.1.1.169.2041 &rep=rep1 &type= pdf>>, International Conference on Management of Data, Jun. 6-11, 2010, pp. 12.

Kraska, et al., "Consistency Rationing in the Cloud: Pay only when it Matters", Retrieved at << http://www.dbis.ethz.ch/research/publications/ConsistencyRationing.pdf >>, VLDB, Aug. 24-28, 2009, pp. 12.

"Microsoft Windows Azure", << Retrieved at http://www.microsoft.com/windowsazure/windowsazure/ >>, Retrieved Date: Sep. 23, 2010, pp. 3.

"Microsoft Common Log File System", Retrieved at<< http://tinyurl.com/2fwlmux >>, Retrieved Date: Sep. 23, 2010, pp. 2.

"TPC-W Benchmarks", Retrieved at << http://www.tpc.org/tpcw/ >>, Retrieved Date: Sep. 23, 2010, pp. 2.

Vo, et al., "Towards Elastic Transactional Cloud Storage with Range Query Support", Retrieved at << http://www.comp.nus.edu.sg/-ooibc/vldb10-ecstore.pdf >>, Proceedings of the VLDB Endowment, vol. 3, No. 1, Sep. 13-17, 2010.

Vogels, Werner, "Data Access Patterns in the Amazon.com Technology Platform", Retrieved at << http://www.vldb.org/conf/2007/papers/special/p1-vogels.pdf >>, VLDB Endowment, Sep. 23-28, 2007, p. 1.

"Eventually Consistent", Retrieved at<< http://delivery.acm.org/10.1145/1470000/1466448/p14-vogels.pdf?key1 =1466448 &key2=4311225821 &coii=GUIDE&di=GUIDE&CFID=105694312&Cftoken=81275856 >>, Oct. 2008, p. 14-19.

Wei, et al., "Scalable Transactions for Web Applications in the Cloud", Retrieved at http://citeseerx.ist.psu.edu/28 viewdoc/download;jsessionid=814EOD 113E EA504CC4A9FA 1 CDEF636CD?doi=10.1.1.148 .4519&rep=rep1&type=pdf >>, Proceedings of the 15th International Euro-Par Conference on Parallel Processing, 2009, pp. 12.

Wei, et al., "CioudTPS: Scalable Transactions for Web Applications in the Cloud", Retrieved at http://www.globule.org/publi/CSTWACircs53.pdf , Feb. 15, 2010, p. 1-44.

Sears et al., "Stasis: Flexible Transactional Storage",In Proceedings of the OSDI '06: 7th USENIX Symposium on Operating Systems Design and Implementation, Nov. 6-8, 2006, pp. 29-44.

Barga, et al. "Recovery Guarantees for Multi-tier Applications", In Proceedings of the 18th ICDE '02 Conference, San Jose, 2002, 12 pages.

Bernstein, et al. "Implementing Recoverable Requests Using Queues", In Proceedings of SIGMOD Conference on Management of data, 1990, Atlantic City, 1990, pp. 112-122.

Weikum, et al., "Multi-Level Recovery." In Proceedings of PODS 1990: 109-123, 1990.

Lomet, et al. "Robust Web Services via Interaction Contracts", In Proceedings of TES Workshop, Toronto, 2004, pp. 1-14.

Lomet, et al. "Persistent Middle Tier Components without Logging", In Proceedings of IDEAS 2005, Montreal, 2005, 10 pages.

Lomet, et al. "MLR: A Recovery Method for Multi-Level Systems." in Proceedings of SIGMOD 1992, San Diego, CA, 1992, 12 pages.

Lomet, et al. "Advanced Recovery Techniques in Practice," in Recovery Mechanisms in Database Systems, Prentice Hall PTR 1998, 13 pages.

Lomet, et al., "Concurrency and Recovery for Index Trees." VLDB Journal (1997) vol. 6, pp. 224-240.

Agrawal, et al. "Integrated concurrency control and recovery mechanisms: Design and performance evaluation". ACM TODS, 10(4): 529-564, 1985.

Agrawal, et al. The performance of concurrency control and recovery algorithms for transaction-oriented database systems. IEEE Database Eng. Bull., vol. 8, No. 2, (Jun. 1985), pp. 58-67.

Franklin, et al. "Crash Recovery in client-server EXODUS," In Proceedings of SIGMOD 1992, pp. 165-174, 1992.

Haas, et al. "Starburst mid-flight: As the dust clears". In Proceedings of IEEE Transactions on Knowledge and Data Engineering (TKDE), vol. 2, No. 1, Mar. 1990, pp. 143-160.

IEEE TCDE. Bulletin of the TC on Data Engineering. IEEE Computer Society, vol. 8, No. 2, Jun. 1985. Available at: http://sites.computer.org/debull/85JUN-CD.pdf.

Jhingran, et al. "Analysis of recovery in a database system using a write-ahead log protocol." In Proceedings of SIGMOD 1992, pp. 175-184, 1992.

Mohan, et al. "ARIES/CSA: A Method for Database Recovery in Client-Server Architectures". In Proceedings of SIGMOD 1994, pp. 55-66, 1994.

Salles, et al. "An Evaluation of Checkpoint Recovery for Massively Multiplayer Online Games". In Proceedings of PVLDB 2009, vol. 2, No. 1, 2009, 12 pages.

Brantner, et al. "Building a database on S3". In Proceedings of SIGMOD 2008, Jun. 9-12, 2008, pp. 251-264.

Berenson, et al. "A Critique of ANSI SQL Isolation Levels". In Proceedings of SIGMOD 1995, 1995, pp. 1-10.

Cahill, et al. "Serializable Isolation for Snapshot Databases". In Proceedings of SIGMOD 2008, 2008, pp. 729-738.

(56) References Cited

OTHER PUBLICATIONS

Gray, et al. "The Recovery Manager of the System R Database Manager". Computing Surveys, vol. 13, No. 2, Jun. 1981, pp. 221-242.
Harizopoulos, et al. "A Case for Staged Database Systems". In Proceedings of CIDR 2003, 12 pages.
Harizopoulos, et al. "OLTP Through the Looking Glass, and What We Found There". In Proceedings of SIDMOD 2008, Jun. 9-12, 2008, pp. 981-992.
Hellerstein, et al. "Architecture of a Database System". Foundations and Trends in Databases, vol. 1, No. 2 (2007) pp. 141-259.
Herlihy, et al. "Linearizability: A Correctness Criterion for Concurrent Objects." ACM Transactions on Programming Languages and Systems, vol. 12, No. 3, Jul. 1990,pp. 463-492.
Jones, et al. "The Atomic Manifesto: a Story in Four Quarks." ACM SIGOPS Operating Systems Review, vol. 39 Issue 2, Apr. 2005, pp. 41-46.
Lomet, D.B. "Key Range Locking Strategies for Improved Concurrency." In Proceedings of the 19th VLDB Conference, Dublin, Ireland, 1993, pp. 185-194.
"MemSQL Architecture—The Fast (MVCC, InMem, LockFree, CodeGen) and Familiar (SQL)", Published on: Aug. 14, 2012, Available at: http://highscalability.com/blog/2012/8/14/memsql-architecture-the-fast-mvcc-inmem-lockfree-codegen-and.html.
Delaney, Kalen, "SQL Server In-Memory OLTP Internals Overview", In White Paper of SQL Server, Mar. 2014, 50 pages.
Rastogi, et al., "Versioning Algorithms for Improving Transaction Predictability in Real-time Main-Memory Databases", Retrieved on: Sep. 10, 2014, Available at: <<http://Www.Cse.Iitb.Ac.In/~Sudarsha/Pubs-Dir/Datablitz-Rtss-Final.Pdf>>, Real-Time Systems, vol. 19, No. 3 (2000), pp. 283-302.
"Redo Processing", Published on: Oct. 7, 2011, Available at: http://www.datadisk.co.uk/html_docs/oracle_dg/redo.htm.
Pollett, Chris, "Checkpointing, Redo, Undo/Redo Logging", Published on: Apr. 20, 2005, Available at: http://www.cs.sjsu.edu/faculty/pollett/157b.12.05s/Lec20042005.pdf.
Zaitsev, Peter, "MVCC: Transaction IDs, Log Sequence Numbers and Snapshots", Published on: Dec. 19, 2007, Available at: http://www.percona.com/blog/2007/12/19/mvcc-transaction-ids-log-sequence-numbers-and-snapshots/.
Graefe, et al., "Transaction Support for Indexed Summary Views", In Proceedings of the ACM SIGMOD International Conference on Management of Data, Jun. 13, 2004, pp. 323-334.
Badarla, Venkata Ramana, "Concurrency Control Techniques", Lecture Slides, Retrieved on: Sep. 10, 2014, Available at: http://home.iitj.ac.in/~ramana/ch12-concurrency-control.pdf.
Diaconu, et al., "Hekaton: SQL Server's Memory-Optimized OLTP Engine", In Proceedings of ACM SIGMOD International Conference on Management of Data, Jun. 22, 2013, pp. 1243-1254.
Larson, et al., "High-Performance Concurrency Control Mechanisms for Main-Memory Databases", In Proceedings of the VLDB Endowment, vol. 5, Issue 4, Dec. 2011, pp. 298-309.
Levandoski, et al., "Indexing on Modern Hardware: Hekaton and Beyond", In Proceedings of ACM SIGMOD International Conference on Management of Data, Jun. 22, 2014, pp. 717-720.
Levandoski, et al., "LLAMA: A Cache/Storage Subsystem for Modern Hardware", In Proceedings of the VLDB Endowment, vol. 6, Issue 10, Aug. 2013, pp. 877-888.
Levandoski, et al., "The Bw-Tree: A B-Tree for New Hardware Platforms" In Proceedings of IEEE 29th International Conference on Data Engineering Apr. 8, 2013, 12 pages.
Lomet, et al., "Multi-Version Concurrency via Timestamp Range Conflict Management", In Proceedings of IEEE 28th International Conference on Data Engineering, Apr. 1, 2012, 12 pages.
Lomet, et al., "Unbundling Transaction Services in the Cloud", In Proceedings of Fourth Biennial Conference on Innovative Data Systems Research, Jan. 4, 2009, 10 pages.
Reed, David Patrick, "Naming and Synchronization in a Decentralized Computer System", In Thesis of Massachusetts Institute of Technology. Dept. of Electrical Engineering and Computer Science, Sep. 1978, 187 pages.
U.S. Appl. No. 14/335,927, Sengupta, et al., "High Throughput Data Modifications Using Blind Update Operations", filed Jul. 20, 2014, 67 pages.
U.S. Appl. No. 13/924,567, Lomet, et al., "Latch-Free Log-Structured Storage for Multiple Access Methods", filed Jun. 22, 2013, 65 pages.
"Building the Customer-Centric Systems Architecture", << http://mike2.openmethodology.org/wiki/Building_the_Customer-Centric_Systems_Architecture>>, last accessed Nov. 17, 2008. 3 pages.
Greenwood, P., et al. Reference Architecture v3.0, <<http://www.aosd-europe.net/deliverables/d103.pdf>>, Jan. 8, 2008. 49 pages.
Kasshyap, Aditya, "File System Extensibility and Reliability Using an in-Kernel Database," <<http://www.fsl.cs.sunysb.edu/docs/kbdbfsmsthesis/index.html>>, Last accessed Nov. 17, 2008. 24 pages.
Office Action mailed Jul. 22, 2011 for Lomet et al., "Unbundled Storage Transaction Services," U.S. Appl. No. 12/362,481, filed Jan. 29, 2009, 11 pages.
Response filed Oct. 26, 2011, in response to Office Action mailed Jul. 22, 2011 for Lomet et al., "Unbundled Storage Transaction Services," U.S. Appl. No. 12/362,481, filed Jan. 29, 2009, 15 pages.
Notice of Allowance mailed Dec. 29, 2011 for Lomet et al., "Unbundled Storage Transaction Services," U.S. Appl. No. 12/362,481, filed Jan. 29, 2009, 12 pages.
Office Action mailed Jan. 30, 2013 for Lomet et al., "Transaction Support for Distributed Data," U.S. Appl. No. 12/986,962, filed Jan. 7, 2011, 35 pages.
Response filed Apr. 30, 2013, in response to Office Action mailed Jan. 30, 2013 for Lomet et al., "Transaction Support for Distributed Data," U.S. Appl. No. 12/986,962, filed Jan. 7, 2011, 13 pages.
Office Action mailed Aug. 22, 2013 for Lomet et al., "Transaction Support for Distributed Data," U.S. Appl. No. 12/986,962, filed Jan. 7, 2011, 39 pages.
Response filed Nov. 22, 2013, in response to Office Action mailed Aug. 22, 2013 for Lomet et al., "Transaction Support for Distributed Data," U.S. Appl. No. 12/986,962, filed Jan. 7, 2011, 13 pages.
Office Action mailed Dec. 16, 2013 for Lomet et al., "Transaction Support for Diributed Data," U.S. Appl. No. 12/986,962, filed Jan. 7, 2011, 41 pages.
Response filed Mar. 17, 2014, in response to Office Action mailed Dec. 16, 2013 for Lomet et al., "Transaction Support for Distributed Data," U.S. Appl. No. 12/986,962, filed Jan. 7, 2011, 13 pages.
Notice of Allowance mailed Jul. 8, 2014 for Lomet et al., "Transaction Support for Distributed Data," U.S. Appl. No. 12/986,962, filed Jan. 7, 2011, 143 pages.
Office Action mailed Jun. 7, 2012 for Lomet et al., "Logical Recovery with Unbundled Transaction Services," U.S. Appl. No. 12/827,941, filed Jun. 30, 2010, 9 pages.
Response filed Oct. 8, 2012, in response to Office Action mailed Jun. 7, 2012 for Lomet et al., "Logical Recovery with Unbundled Transaction Services," U.S. Appl. No. 12/827,941, filed Jun. 30, 2010, 11 pages.
Office Action mailed Mar. 21, 2013 for Lomet et al., "Logical Recovery with Unbundled Transaction Services," U.S. Appl. No. 12/827,941, filed Jun. 30, 2010, 11 pages.
Response filed Jul. 22, 2013, in response to Office Action mailed Mar. 21, 2013 for Lomet et al., "Logical Recovery with Unbundled Transaction Services," U.S. Appl. No. 12/827,941, filed Jun. 30, 2010, 13 pages.
Office Action mailed Jan. 17, 2014 for Lomet et al., "Logical Recovery with Unbundled Transaction Services," U.S. Appl. No 13/827,941, filed Jun. 30, 2010, 5 pages.
Notice of Allowance mailed Jan. 31, 2014 for Lomet et al., "Logical Recovery with Unbundled Transaction Services," U.S. Appl. No. 12/827,941, filed Jun. 30, 2010, 17 pages.
Chow., et al., Distributed Operating Systems and Algorithms, Addison Wesley Longman, Inc., Reading, Massachusetts, 1997, Title Pages, Preface and Sections 4.3, 6.3 and 12.1, pp. ii, iii, vii-xii, 123-127, 207-218 and 425-452.

(56) References Cited

OTHER PUBLICATIONS

Lomet, D., "Persistent Applications Using Generalized Redo Recovery," Proceedings, 14th International Conference on Data Engineering, IEEE, 1998, pp. 154-163.

Lomet et al, "Redo Recovery after System Crashes," Proceedings of the 21st VLDB Conference, Zurich, Switzerland, 1995, pp. 457-468.

Lomet et al., "Implementing Performance Competitive Logical Recovery", Proceedings of the VLDB Endowment, vol. 4, Issue 7, Apr. 2011, pp. 430-439.

Sears, et al., "Segment-Based Recovery: Write-Ahead Logging Revisited", Retrieved at << http://www.vldb.org/pvldb/2/vldb09-583.pdf >>, Proceedings of the VLDB Endowment, vol. 2, No. 1, Aug. 24-28, 2009, pp. 12.

Lomet, et al., "Logical Logging to Extend Recovery to New Domains", Retrieved at << http://www.markrtuttle.com/papers/lt99-sigmod.pdf>>, ACM SIGMOD Record, vol. 28, No. 2, Jun. 1999, pp. 12.

Lomet, et al., "A Theory of Redo Recovery", Retrieved at << www.markrtuttle.com/papers/lt03.ps >>, International Conference on Management of Data, Proceedings of the 2003 ACM SIGMOD international conference on Management of data, Jun. 9-12, 2003, pp. 10.

Lomet, et al., "Locking Key Ranges with Unbundled Transaction Services", Retrieved at << http://www.research.microsoft.com/pubs/81295/Part-Lock.pdf >>, Proceedings of the VLDB Endowment, vol. 2, No. 1, Aug. 24-28, 2009, pp. 12.

"Inside Microsoft SQL Server 2005: The Storage Engine", Retrieved at << http://www.microsoft.com/PRODUCTS/info/product.aspx?view=22&pcid=6bf6f680-9f37-403b-85ba-3fbee8c27f00&type=ovr >>, Retrieved Date: Nov. 9, 2009, pp. 2.

Mohan, et al., "ARIES: A Transaction Recovery Method Supporting Fine-Granularity Locking and Partial Rollbacks Using Write-Ahead Logging", Retrieved at << http://www.cs.berkeley.edu/~brewer/cs262/Aries.pdf >>, ACM Transactions on Database Systems (TODS), vol. 17, No. 1, Mar. 1992, pp. 94-162.

Mohan, et al., "ARIES/IM: An Efficient and High Concurrency Index Management Method Using Write-ahead Logging," SIGMOD 1992, pp. 371-380.

Stonebraker, et al., "One Size Fits All: An Idea Whose Time Has Come and Gone", In Proceedings of ICDE 2005, 2005, 10 pages.

Bernstein, et al. "Principles of Transaction Processing", Morgan Kaufmann, 1996.

\* cited by examiner

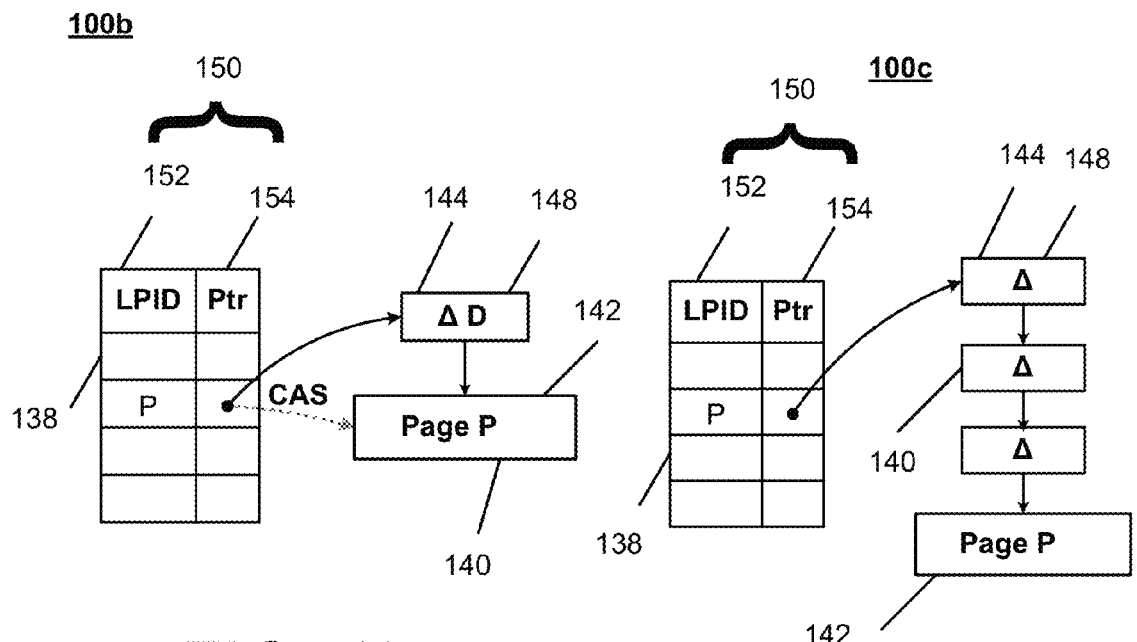
FIG. 1b
FIG. 1c
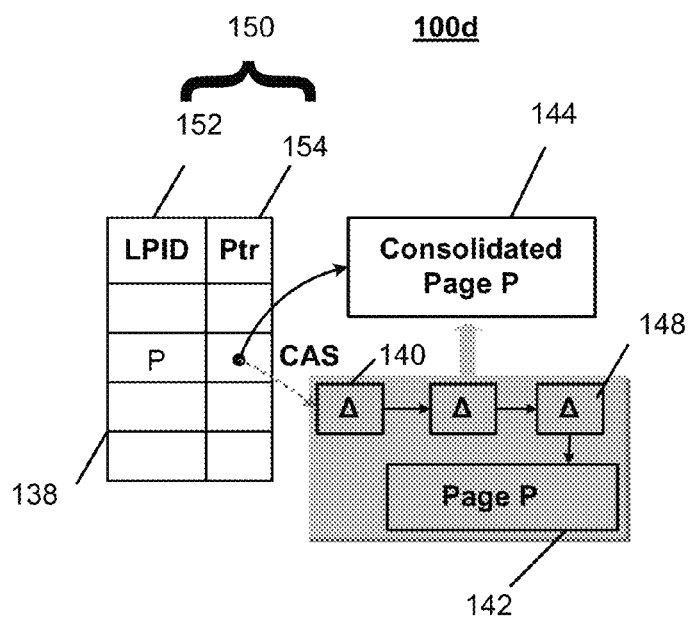
FIG. 1d

200b

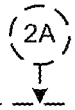

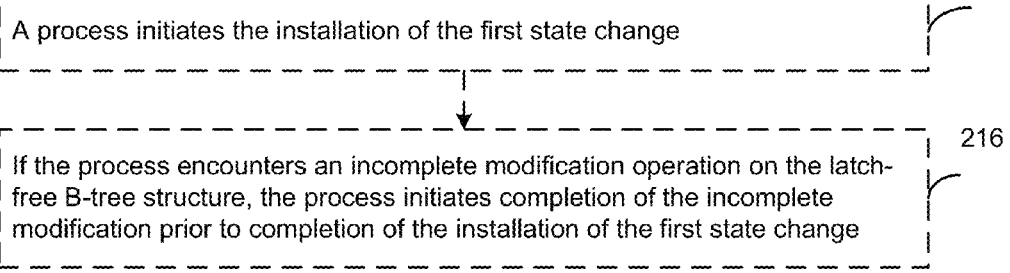

214 — A process initiates the installation of the first state change

216 — If the process encounters an incomplete modification operation on the latch-free B-tree structure, the process initiates completion of the incomplete modification prior to completion of the installation of the first state change

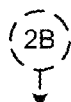

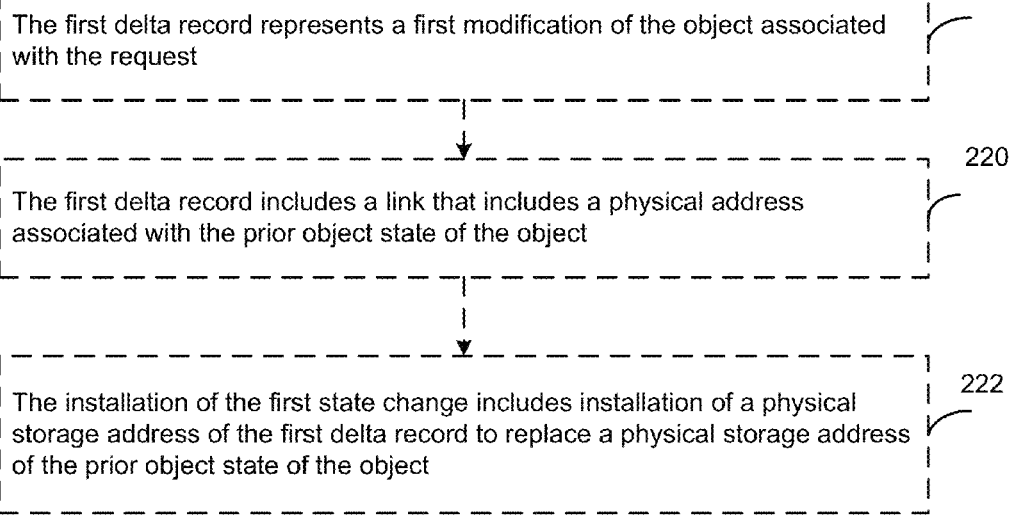

218 — The first delta record represents a first modification of the object associated with the request 220 — The first delta record includes a link that includes a physical address associated with the prior object state of the object 222 — The installation of the first state change includes installation of a physical storage address of the first delta record to replace a physical storage address of the prior object state of the object

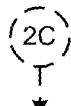

224 — The first atomic operation includes a compare and swap (CAS) operation

238 — Determine that a size of a page associated with the latch-free B-tree structure exceeds a predetermined maximal value threshold

240 — Initiate a split of at least one node of the latch-free B-tree structure that is associated with the page, wherein initiating the split of the at least one node includes initiating a prepending of a split delta record to the node, wherein the split delta record includes a separator key value and a logical address corresponding to a side pointer associated with a sibling node that includes node data from the split node, and initiating a prepending of an index term delta record to a parent node of the node, wherein the index term delta record includes a logical address corresponding to a pointer to the node, the separator key value, and a logical address corresponding to a pointer to the sibling node (2F)
↓

242 — Determining that a size of a page associated with the latch-free B-tree structure is smaller than a predetermined low value threshold

244 — Initiate a merge of a node of the latch-free B-tree structure that is associated with the page

246 — Initiating the merge of the node includes initiating a prepending of a remove node delta record to the node, wherein the remove node delta record indicates a removal of the node, initiating a prepending of a node merge delta record to a left sibling node of the node, wherein the node merge delta record includes a physical address of the contents of the node, and initiating a prepending of an index term delete delta record to a parent node of the node, wherein the index term delete delta record indicates a deletion of the node and an indication that the left sibling node of the node includes a key space of the node

STRUCTURING STORAGE BASED ON LATCH-FREE B-TREES

BACKGROUND

Users of electronic devices frequently need to access database systems to obtain various types of information. Many different techniques have been devised for storage and retrieval of data items. For example, if a system is designed to simply employ linear search on stored data records, a user may have to wait several minutes, or longer, to obtain search results. However, if a system employs structures such as trees for indexing purposes, data records or data items may be stored in structured configurations, for example, to provide more efficient search and retrieval performance.

SUMMARY

According to one general aspect, a system may include a tree manager configured to control tree operations associated with a latch-free B-tree structure. The system may also include a map table manager configured to initiate table operations on an indirect address mapping table associated with the latch-free B-tree structure. The table operations may include initiating an atomic compare and swap operation on an entry in the indirect address mapping table, to replace a prior state of a page associated with the latch-free B-tree structure with a new state of the page.

According to another aspect, a request to modify an object in storage that is associated with one or more computing devices may be obtained. The storage may be organized based on a latch-free B-tree structure. A storage address of the object may be determined, based on accessing a mapping table that includes map indicators mapping logical object identifiers to physical storage addresses. A prepending of a first delta record to a prior object state of the object may be initiated, the first delta record indicating an object modification associated with the obtained request. Installation of a first state change associated with the object modification may be initiated, via a first atomic operation on a mapping table entry that indicates the prior object state of the object.

According to another aspect, a computer program product tangibly embodied on a computer-readable storage medium may include executable code that may cause at least one data processing apparatus to determine that a size of a page associated with a latch-free B-tree structure is unacceptable. Further, the at least one data processing apparatus may initiate a modification of a node of the latch-free B-tree structure that is associated with the page, based on initiating a prepending of a delta record to the node, and initiating at least one atomic operation to update an indirect address table to replace the physical address of the node with a physical address of the delta record. The delta record may include an indication of the modification and a physical address pointer to the node. The indirect address table may include logical page identifiers and corresponding physical addresses of physical pages associated with the logical page identifiers.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. The details of one or more implementations are set forth in the accompanying drawings and the description below. Other features will be apparent from the description and drawings, and from the claims.

DRAWINGS

DETAILED DESCRIPTION

Figure 1A:
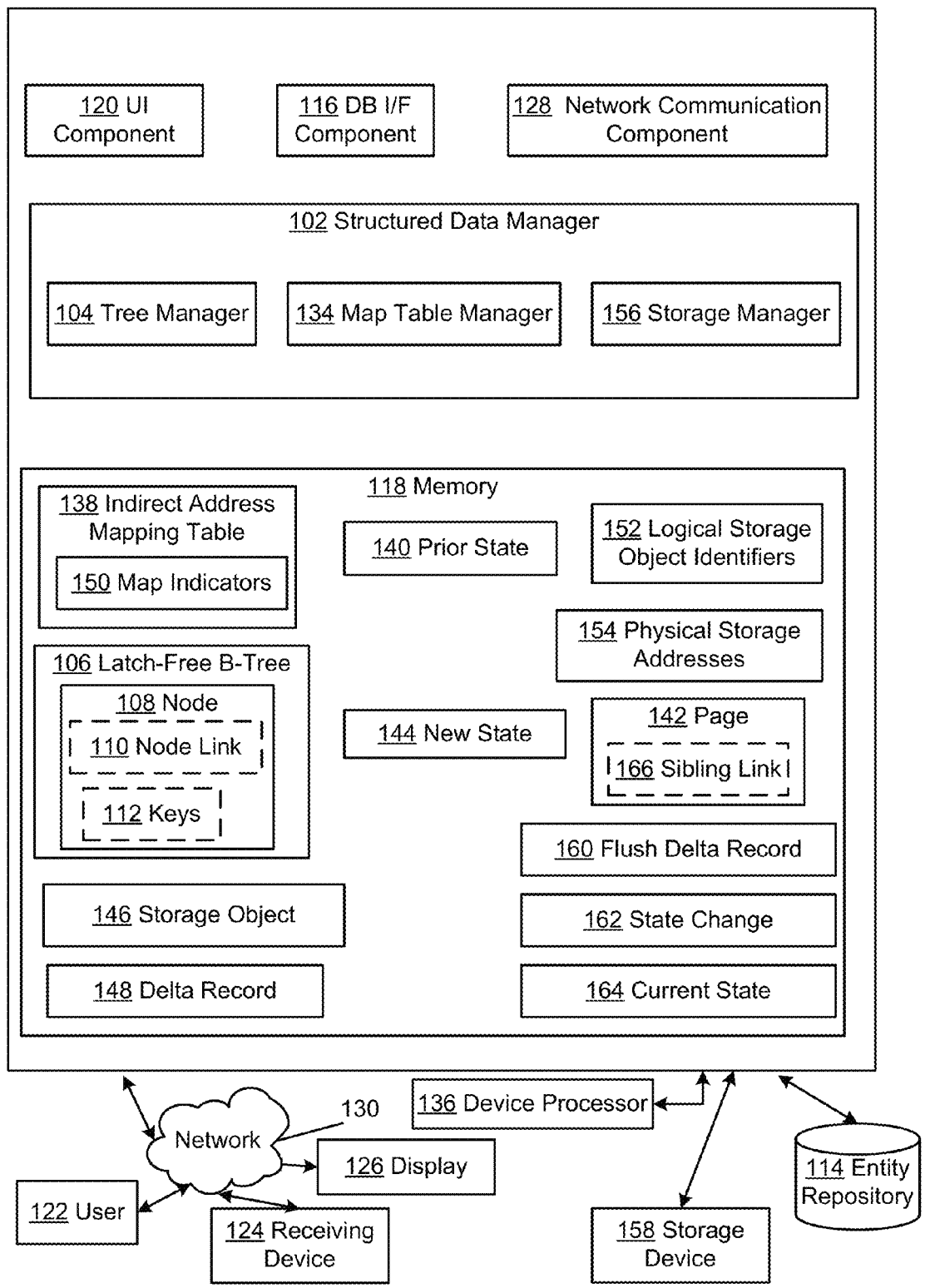
FIG. 1 is a block diagram of an example system for structuring storage based on latch-free B-trees.

Recent developments in hardware and platforms has prompted reconsideration of database systems architectures. However, several database functions have maintained their importance in design considerations. For example, high-performance key indexed access to data records may impact database performance significantly. High performance coupled with multi-core CPUs may involve substantial levels of concurrency.

Example techniques discussed herein may provide mapping tables that may virtualize both the location and the size of pages. For example, such virtualization may be utilized for both main memory designs and stable storage designs (e.g., log structured storage designs), as discussed further herein.

In this context, a "page" may refer to an object in storage, which may be accessed via a physical storage address. As used herein, a "page" may be associated with a flexible size, and may represent a page unit of storage that may be distributed over multiple discontiguously stored segments of contiguous storage. The storage may include volatile and/or stable storage.

Example techniques discussed herein may provide a B-tree type of structure, which may be referred to herein as a "Bw-tree" structure (e.g., as a latch-free B-tree structure), as discussed further below. For example, updates to Bw-tree nodes may be performed based on prepending update deltas to a prior page state. Thus, the Bw-tree may be latch-free, as it may allow concurrent access to pages by multiple threads. Because such delta updating preserves the prior state of a page, it may provide improved processor cache performance as well.

Example techniques discussed herein may further provide page splitting techniques that are also latch-free, and that may employ B-link tree style side pointers. Splits (and other structure modification operations) may be atomic both within main memory and when made stable.

According to example embodiments discussed herein, atomic record stores may be implemented based on a Bw-tree architecture.

As further discussed herein, FIG. 1 is a block diagram of a system 100 for structuring storage based on latch-free B-trees. As shown in FIG. 1a, a system 100a may include a structured data manager 102 that includes a tree manager 104 that may be configured to control tree operations associated with a latch-free B-tree structure 106. As shown in FIG. 1, the latch-free B-tree structure 106 may include a plurality of nodes 108. Each node 108 may include one or more links 110, for example, to indicate related nodes such as children nodes or sibling nodes. Further the nodes 108 may include key values 112, for example, indicating separator values associated with key values that may be associated with other nodes in the latch-free B-tree structure 106 (e.g., child nodes, or subtrees, in relation to a current node). For example, some nodes may not include links 110, and some nodes may not include key values 112.

According to an example embodiment, some information stored on the latch-free B-tree structure 106 may be similar to that of a conventional B-tree. For example, index nodes may include (separator key, pointer) pairs that direct searches down the tree, while data (leaf) nodes may include (key, record) pairs. According to an example embodiment, pages may also include a high key value representing a largest possible key value stored on the page (and in the subtree below), and a side link pointer that points to the node's immediate right sibling on the same level in the tree. Such a side link representation may be similar to such links in B-link designs as discussed in P. L. Lehman and S. B. Yao, "Efficient Locking for Concurrent Operations on B-Trees," *Transactions on Database Systems*, vol. 6, no. 4 (1981), pp. 650-670.

Generally, B-trees may be balanced based on size constraints imposed on nodes in the structure, and on size constraints imposed on storage of the records. Such balancing may involve splits and/or merges of various objects associated with the B-tree.

According to example embodiments discussed herein, "pages" associated with the latch-free B-tree structure 106 may be "logical," as they do not occupy fixed physical locations. For example, a page may be identified using its index into a mapping table, as discussed further below. Accessors to the page may use the mapping table to translate a logical identifier associated with the page into its physical address. According to example embodiments discussed herein, pointers between nodes 108 of the latch-free B-tree structure 106 may be logical.

According to example embodiments discussed herein, pages may be "elastic," as there is no predefined limit on how large a page may grow. According to example embodiments discussed herein, pages may grow based on having "delta records" prepended to them. For example, a delta record may represent one or more modifications (e.g., inserts, updates), as discussed further below.

According to an example embodiment, the structured data manager 102, or one or more portions thereof, may include executable instructions that may be stored on a computer-readable storage medium, as discussed below. According to an example embodiment, the computer-readable storage medium may include any number of storage devices, and any number of storage media types, including distributed devices.

For example, an entity repository 114 may include one or more databases, and may be accessed via a database interface component 116. One skilled in the art of data processing will appreciate that there are many techniques for storing repository information discussed herein, such as various types of database configurations (e.g., relational databases, hierarchical databases, distributed databases) and non-database configurations.

According to an example embodiment, the structured data manager 102 may include a memory 118 that may store the latch-free B-tree structure 106. In this context, a "memory" may include a single memory device or multiple memory devices configured to store data and/or instructions. Further, the memory 118 may span multiple distributed storage devices.

According to an example embodiment, a user interface component 120 may manage communications between a user 122 and the structured data manager 102. The user 122 may be associated with a receiving device 124 that may be associated with a display 126 and other input/output devices. For example, the display 126 may be configured to communicate with the receiving device 124, via internal device bus communications, or via at least one network connection.

According to example embodiments, the display 126 may be implemented as a flat screen display, a print form of display, a two-dimensional display, a three-dimensional display, a static display, a moving display, sensory displays such as tactile output, audio output, and any other form of output for communicating with a user (e.g., the user 122).

According to an example embodiment, the structured data manager 102 may include a network communication component 128 that may manage network communication between the structured data manager 102 and other entities that may communicate with the structured data manager 102 via at least one network 130. For example, the network 130 may include at least one of the Internet, at least one wireless network, or at least one wired network. For example, the network 130 may include a cellular network, a radio network, or any type of network that may support transmission of data for the structured data manager 102. For example, the network communication component 128 may manage network communications between the structured data manager 102 and the receiving device 124. For example, the network communication component 128 may manage network communication between the user interface component 120 and the receiving device 124.

A map table manager 134 may be configured to determine, via a device processor 136, table operations on an indirect address mapping table 138 associated with the latch-free B-tree structure 106. The table operations may include initiating an atomic compare and swap operation on an entry in the indirect address mapping table 138, to replace a prior state 140 of a page 142 associated with the latch-free B-tree structure 106 with a new state 144 of the page 142. For example, the atomic compare and swap operation may include a compare and swap (CAS) instruction, as discussed further below.

Although the page 142 is shown as being located in the memory 118 of FIG. 1, one skilled in the art of data processing will appreciate that the page 142 may be located in storage that is situated external to the memory 118, or external to the structured data manager 102, including volatile or stable storage.

In this context, a "processor" may include a single processor or multiple processors configured to process instructions associated with a processing system. A processor may thus include one or more processors processing instructions in parallel and/or in a distributed manner. Although the device processor 136 is depicted as external to the structured data manager 102 in FIG. 1, one skilled in the art of data processing will appreciate that the device processor 136 may be implemented as a single component, and/or as distributed units which may be located internally or externally to the structured data manager 102, and/or any of its elements.

Further, "processes" or threads may be used to process information via the processor 136. In this context, a "process" may include a thread, or an independent execution, configured to process information.

As used herein, a "compare and swap" operation, or a "CAS" may refer to an atomic instruction or operation that may be used in a multithreading environment to achieve synchronization. For example, a CAS may compare the contents of a memory location to a given value and, if they are the same, the CAS modifies the contents of that memory location to a given new value. The atomicity may provide assurance that the new value is calculated based on up-to-date information. For example, if the value had been updated by another thread in the interim, the write would fail. The result of the operation indicates whether it performed the substitution, which may be accomplished either with a Boolean response, or by returning the value read from the memory location (not the value written to it). For example, a compare and swap operation may be implemented via a CAS instruction. One skilled in the art of data processing will understand that other instructions or operations may also be used to achieve this (or similar) functionality, without departing from the spirit of the discussion herein.

According to an example embodiment, the indirect address mapping table 138 may be maintained as part of a cache layer. According to an example embodiment, the indirect address mapping table 138 may map logical pages to physical pages (e.g., by mapping logical page identifiers to physical addresses).

According to an example embodiment, logical page identifiers (PIDs) may be used to link the nodes 108 of the latch-free B-tree structure 106. Thus, for example, between nodes 108, links 110 are PIDs, instead of disk or memory addresses. According to an example embodiment, the indirect address mapping table 138 may translate a PID into either the address of a page on stable storage, or the address of the page in memory, thus providing a central location for managing "paginated" storage.

Tree indexing in which nodes are linked together using physical locations, and in which updates change the physical location, may involve cascading of update changes to the root of the tree. However, the indirect address mapping table 138 may sever the connection between physical location and inter-node links, thus enabling the nodes 108 to be "relocated" via updates, and when a page is written to stable storage, without propagating the location change to the root of the latch-free B-tree structure 106. For example, this "relocation" tolerance may enable both delta updating of the nodes 108 in main memory and structuring of stable storage, as discussed further below.

According to an example embodiment, the nodes 108 are logical and do not occupy fixed physical locations, either on stable storage or in main memory. A "page" for a node may thus provide a policy, in terms of how the nodes 108 may be represented, and in terms of how large they may become. According to an example embodiment, page size may be "elastic," as pages may be split when convenient, as splitting size constraints may be alleviated. Further, pages may be updated, free of "update-in-place" constraints.

According to an example embodiment, state changes to a page may be based on prepending a delta record to a prior page state, and installing the state change via an atomic "compare and swap" instruction (CAS instruction) on the page's mapping table slot. According to example embodiments discussed herein, this technique may be used both for data changes and management changes (e.g., flushing pages to stable storage), thus utilizing the virtualization of a page and its elasticity to enable convenient use of CAS.

According to an example embodiment, replacing the prior state 140 of the page 142 with the new state 144 of the page 142 may include at least one of replacing a physical address of a first storage object 146 that includes stored information representing the prior state 140 of the page 142 with a physical address of a delta record 148 that is associated with the new state 144 of the page 142, or replacing a physical address of the first storage object 146 that includes stored information representing the prior state 140 of the page 142 with a physical address of the new state 144 of the page 142.

For example, FIG. 1b depicts an example embodiment of the indirect address mapping table 138, indicating a replacement of the prior state 140 of the page 142 with the new state 144 of the page 142, based on replacing a physical address of first storage object 146 (e.g., the page 142, in FIG. 1b) with a physical address of a delta record 148 that is associated with the new state 144 of the page 142. As shown in FIG. 1b, the replacement is accomplished via an atomic compare and swap operation on a slot in the indirect address mapping table 138 that stores the current state (e.g., via a physical address) associated with the page 142. As shown in FIG. 1b, the delta record 148 is prepended to the prior state 140 (e.g., based on the physical address of page 142), and the physical pointer in the indirect address mapping table 138 that is associated with a logical identifier of the page 142, is replaced with the physical address of the delta record 148, indicating the new state 144 of the page 142 (e.g., the page 142 updated by the information included in the delta record 148.

For example, FIG. 1c depicts an example embodiment of the indirect address mapping table 138, indicating a replacement of the prior state 140 of the page 142 with the new state 144 of the page 142, based on replacing a physical address of first storage object 146 (e.g., which includes the base page 142 with two previously prepended delta records, in FIG. 1c) with a physical address of a delta record 148 that is associated with the new state 144 of the page 142. As shown in FIG. 1c, the replacement is accomplished via an atomic compare and swap operation on a slot in the indirect address mapping table 138 that stores the current state (e.g., via a physical address) associated with the page 142. As shown in FIG. 1c, the delta record 148 is prepended to the prior state 140 (e.g., based on the physical address of the second prepended delta record), and the physical pointer in the indirect address mapping table 138 that is associated with a logical identifier of the page 142, is replaced with the physical address of the delta record 148, indicating the new state 144 of the page 142 (e.g., the page 142 updated by the information included in the chain of prepended delta records, including delta record 148).

As discussed further below, FIG. 1d depicts an example embodiment of the indirect address mapping table 138, indicating a replacement of the prior state 140 of the page 142 with the new state 144 of the page 142, based on replacing a physical address of first storage object 146 (e.g., which includes the base page 142 with a plurality of previously prepended delta records, in FIG. 1d) with a physical address of the new state 144 of the page 142 (e.g., resulting from a consolidation of the page 142 with the previously prepended delta records).

For example, replacing the prior state 140 of the page 142 with the new state 144 of the page 142 may include generating a modified version of the current page 142, or determining another page for replacing the current page 142, and replacing a physical address of the current page 142 with a physical address of the new state 144 of the page 142 (e.g., the modified version or the other page for replacement), via an atomic compare and swap operation on the indirect address mapping table 138.

According to example embodiments discussed herein, latch-free B-trees 106 may be immutable, as update-in-place is not performed on pages associated with the latch-free B-tree 106. Rather, page updates may be prepended to a page in the form of the delta records 148. Delta records 148 may provide incremental updates to page states in a latch-free manner. To update a page P, a new delta record D (148) may be generated that (physically) points to the current state of P 142. For example, this current state pointer may be obtained from P's physical address entry in the indirect address mapping table 138. The delta record 148 may represent the new physical memory address of the page 142. To install this address into P's physical address location in the indirect address mapping table 138, an atomic compare and swap (CAS) instruction may be utilized to remove the current address and install the new address of D (148). As discussed above, a CAS instruction is an atomic (non-blocking) CPU instruction that compares a given value (e.g., P's old address) to an existing value in a memory location (e.g., the physical address entry in the indirect address mapping table 138), and if these values are the same the instruction writes a new value (e.g., the address of the delta record 148) to the memory location in the indirect address mapping table 138. After the CAS returns successfully, the update represented by D (148) is live on the page.

According to an example embodiment, since pointers between the latch-free B-tree 106 nodes 108 are logical, the CAS on the indirect address mapping table 138 may be the only physical pointer change involved to install a page update. Furthermore, this latch-free technique may be the designated way to update a page in the latch-free B-tree 106, and may be uniform across all operations that modify a page. As used herein, a "delta install operation" may refer to usage of the CAS to update a page.

According to an example embodiment, the tree operations may include search and update operations on the latch-free B-tree structure 106.

According to an example embodiment, the indirect address mapping table 138 may include map indicators 150 mapping logical storage object identifiers 152 to physical storage addresses 154.

According to an example embodiment, a storage manager 156 may be configured to initiate operations on storage areas located on one or more storage devices 158 that include storage space associated with the physical storage addresses 154. For example, the storage device 158 may be located internal or external to the structured data manager 102.

According to an example embodiment, the physical storage addresses may include one or more of storage addresses of pages in volatile memory, or storage addresses of pages in stable storage.

According to an example embodiment, the storage manager 156 may be configured to initiate a flush operation of a first page 142 in volatile memory to a location in stable storage, based on initiating a prepending of a flush delta record 160 to the first page 142 in volatile memory, and initiating installation of a first state change 162 associated with the flush operation via a first atomic compare and swap operation on a mapping table entry that indicates a current state 164 of the first page 142, wherein the first state change 162 indicates a flush state of the page 142. Such operations on delta records may be similar to those discussed above with regard to updates.

According to an example embodiment, the indirect address mapping table 138 includes map indicators 150 mapping logical page identifiers to storage addresses, based on mapping logical pages to physical pages in storage.

According to an example embodiment, the latch-free B-tree structure 106 includes node links 110 for traversal, wherein the node links 110 include logical page identifiers, in lieu of storage addresses.

According to an example embodiment, the physical pages may include a group of physical pages that each include a right sibling link 166 that includes a right sibling page identifier associated with a rightmost sibling physical page to the respective physical page, based on the latch-free B-tree structure 106.

According to an example embodiment, the tree manager 104 may be configured to initiate a first update operation on the latch-free B-tree structure 106 based on initiating a prepending of a first delta record 148 to a first state of a first page 142 (e.g., the prior state 140), and initiating installation of a first state change 162 associated with the first update operation via a first atomic compare and swap operation on a mapping table entry that indicates the first state of the first page 142, wherein the first state change indicates a second state of the page 142 (e.g., the new state 144).

According to an example embodiment, the map table manager 134 may be configured to initiate the first atomic compare and swap operation on the mapping table entry that indicates the first state of the first page 142, wherein the mapping table entry that indicates the first state of the first page 142 is updated to indicate the first delta record 148 as a result of the first atomic compare and swap operation. The first delta record 148 may represent at least one modification of the first page 142 associated with the first update operation, similarly as discussed above with regard to FIGS. 1*b* and 1*c*.

Figure 1E:
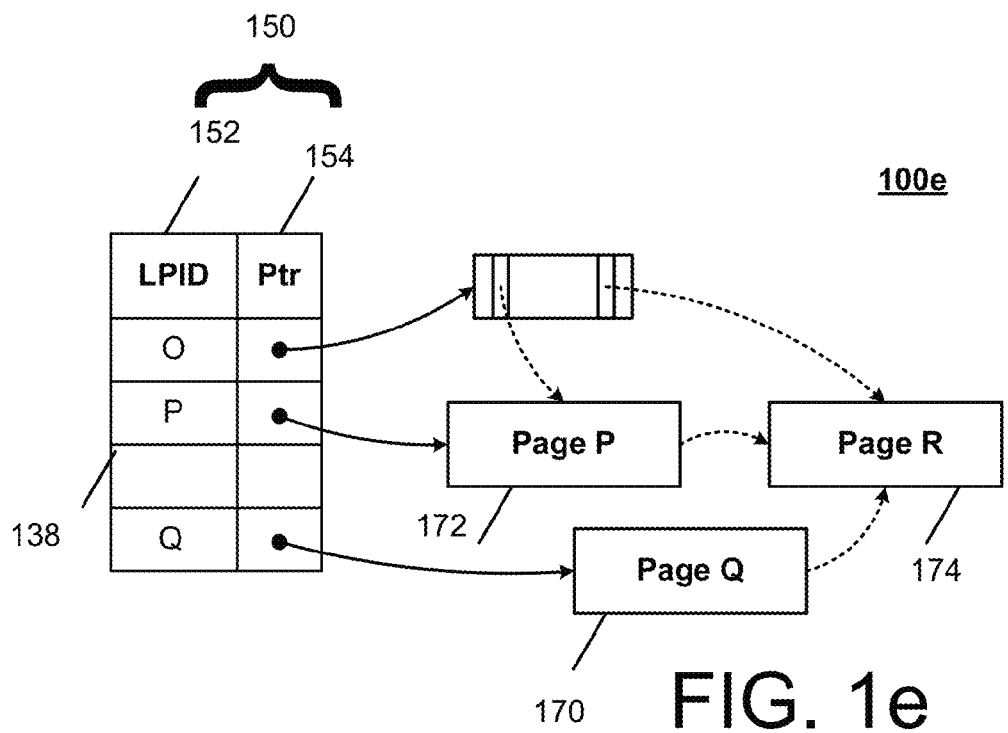
Figure 1F:
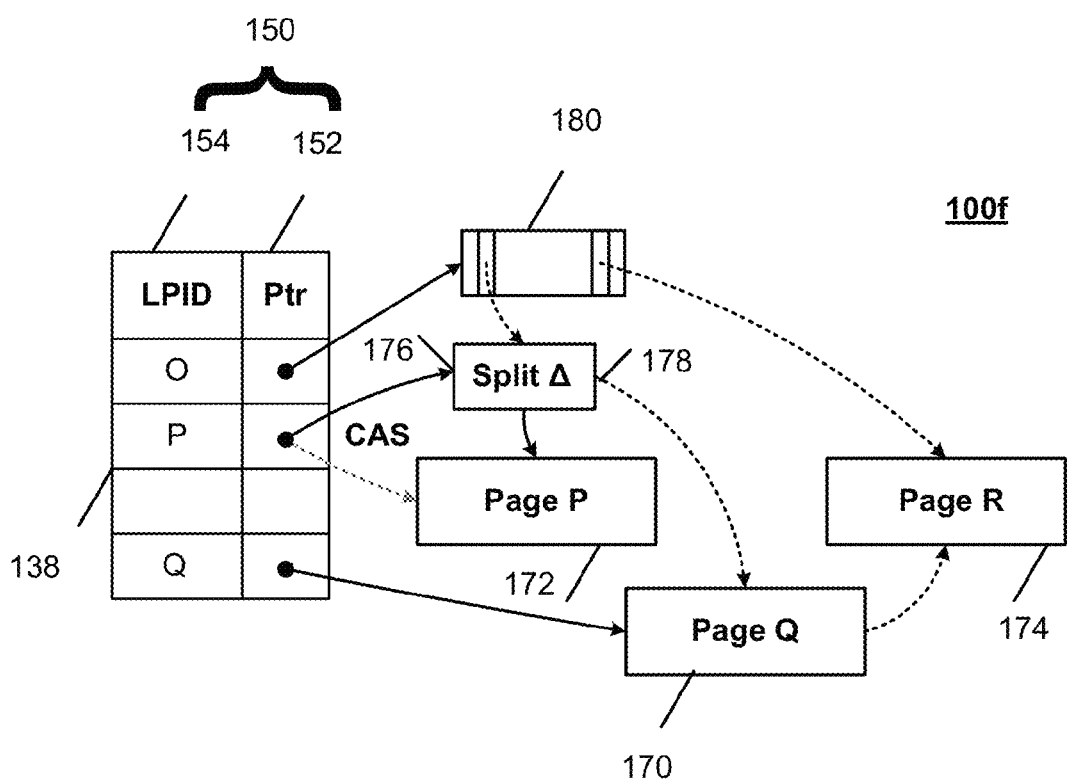
Figure 1G:
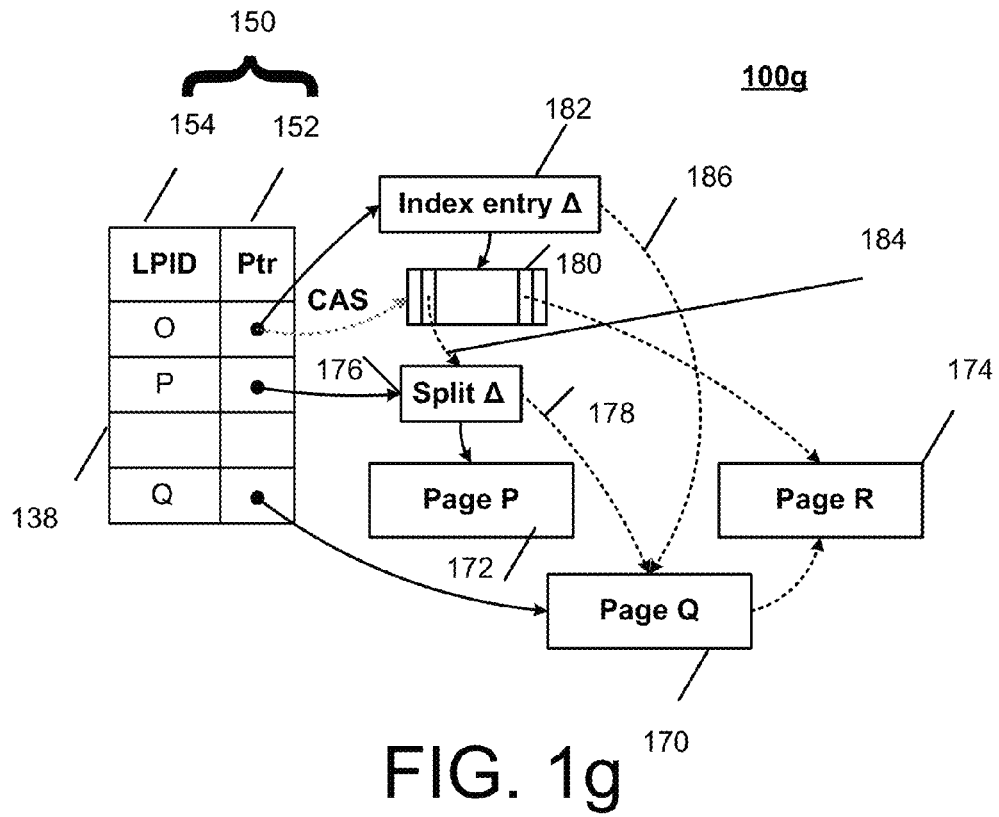
Figure 1H:
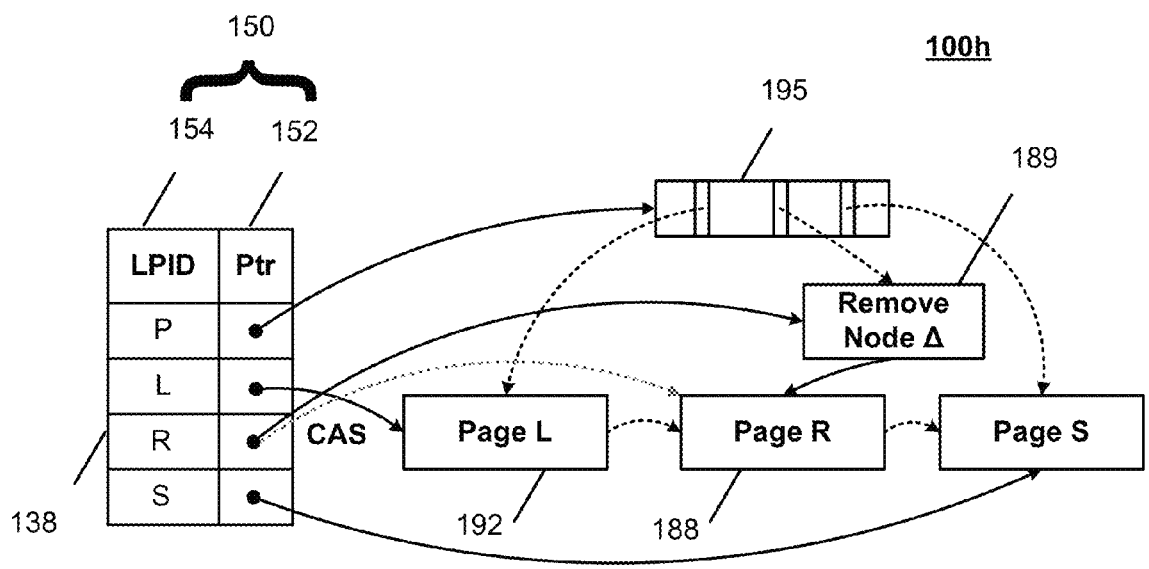
Figure 1I:
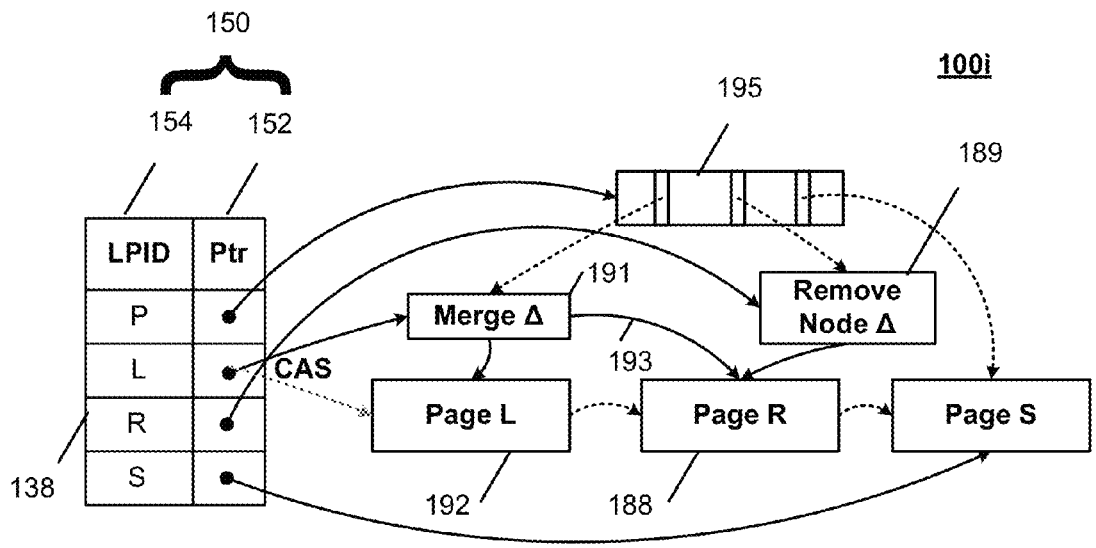
Figure 1J:
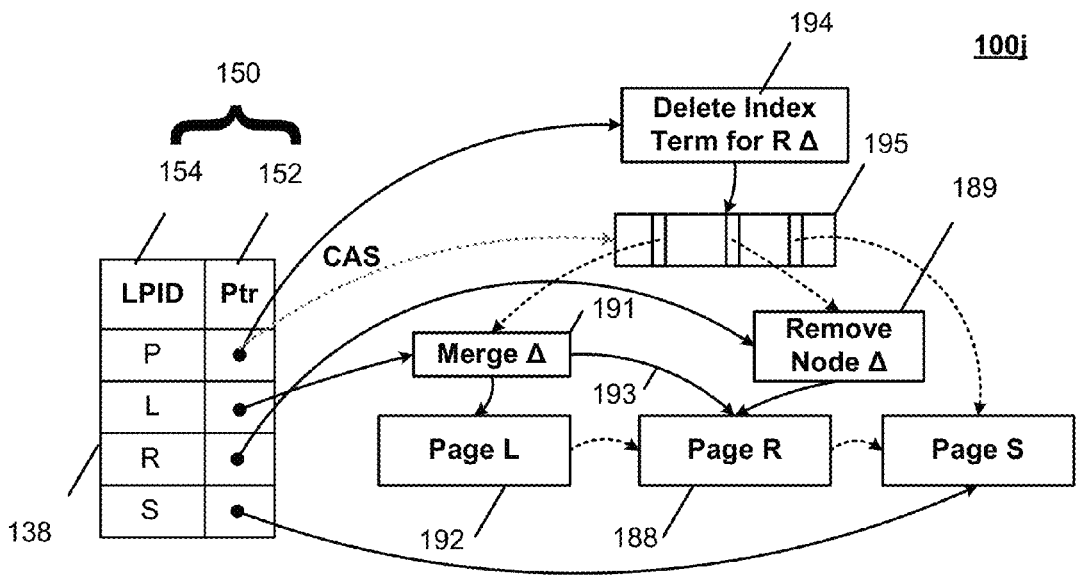
Figure 2A:
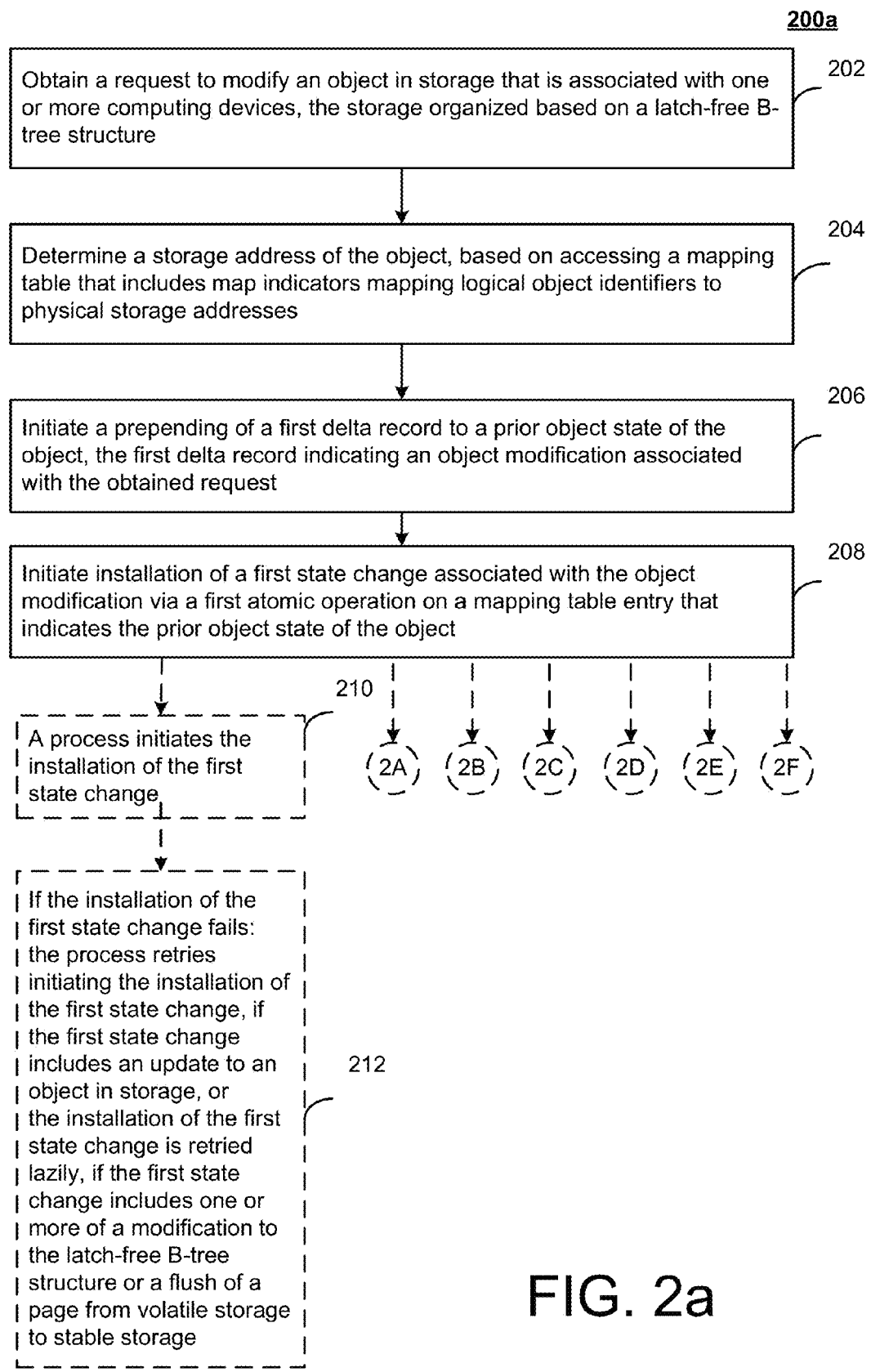
FIG. 2 is a flowchart illustrating example operations of the system of FIG. 1.

FIG. 2*a* is a flowchart illustrating example operations of the system of FIG. 1, according to example embodiments. In the example of FIG. 2*a*, a request to modify an object in storage that is associated with one or more computing devices may be obtained, the storage organized based on a latch-free B-tree structure (202).

A storage address of the object may be determined, based on accessing a mapping table that includes map indicators mapping logical object identifiers to physical storage addresses (204). For example, the physical storage address of the object may be determined, based on accessing the indirect address mapping table 138.

A prepending of a first delta record to a prior object state of the object may be initiated, the first delta record indicating an object modification associated with the obtained request (206).

Installation of a first state change associated with the object modification may be initiated via a first atomic operation on a mapping table entry that indicates the prior object state of the object (208). For example, the first delta record 148 may be prepended to the prior object state 140, and the first state change (e.g., via the delta record 148) associated with the object modification may be initiated via a first atomic operation on a mapping table entry (e.g., via the indirect address mapping table 138) that indicates the prior object state of the object, similarly as discussed above with regard to FIGS. 1*b* and 1*c*.

According to an example embodiment, a process may initiate the installation of the first state change (210). If the installation of the first state change fails, the process may retry initiating the installation of the first state change, if the first state change includes an update to an object in storage. The installation of the first state change may be retried lazily, if the first state change includes one or more of a modification to the latch-free B-tree structure or a flush of a page from volatile storage to stable storage (212).

According to an example embodiment, a process may initiate the installation of the first state change (214), as shown in FIG. 2*b*. If the process encounters an incomplete modification operation on the latch-free B-tree structure, the process may initiate completion of the incomplete modification prior to completion of the installation of the first state change (216).

According to an example embodiment, to ensure that no thread waits for a structure modification (SMO) to complete, a thread that encounters a partial structure modification will complete it before proceeding with its own operation. This may ensure that no thread waits for SMOs and that SMOS are serialized with respect to most update operations and other SMOs.

According to an example embodiment, the first delta record represents a first modification of the object associated with the request (218).

According to an example embodiment, the first delta record includes a link that includes a physical address associated with the prior object state of the object (220). For example, the chain of delta records 148 shown in FIG. 1c may be linked via physical address pointers.

According to an example embodiment, the installation of the first state change includes installation of a physical storage address of the first delta record to replace a physical storage address of the prior object state of the object (222). For example, the physical address of the first delta record 148 may be installed in the indirect address mapping table 138 via an atomic compare and swap operation to replace the prior state 140, as discussed above.

According to an example embodiment, the first atomic operation includes a compare and swap (CAS) operation (224).

Figure 2C:
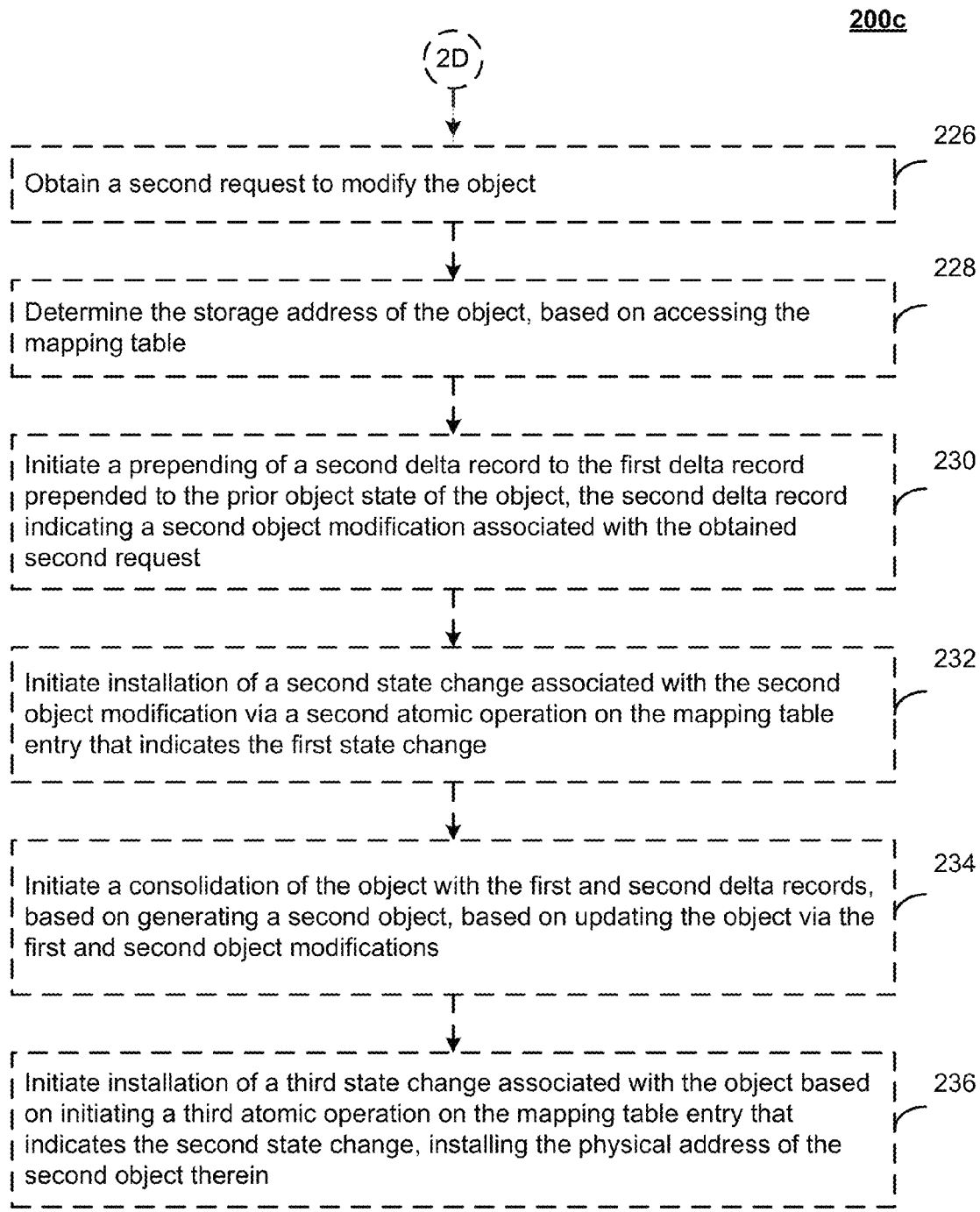

According to an example embodiment, a second request to modify the object may be obtained (226), as indicated in FIG. 2c.

According to an example embodiment, the storage address of the object may be determined based on accessing the mapping table (228). For example, the storage address may be obtained based on accessing the indirect address mapping table 138.

According to an example embodiment, a prepending of a second delta record to the first delta record prepended to the prior object state of the object may be initiated, the second delta record indicating a second object modification associated with the obtained second request (230). For example, a second delta record 148 may be prepended to the prior delta record 148.

According to an example embodiment, installation of a second state change associated with the second object modification may be initiated via a second atomic operation on the mapping table entry that indicates the first state change (232). For example, the installation may be accomplished based on a CAS on the indirect address mapping table 138, as discussed above.

According to an example embodiment, a consolidation of the object with the first and second delta records may be initiated, based on generating a second object, based on updating the object via the first and second object modifications (234).

According to an example embodiment, installation of a third state change associated with the object may be initiated based on initiating a third atomic operation on the mapping table entry that indicates the second state change, installing the physical address of the second object therein (236). FIG. 1d provides an example depicting the consolidation of page P 142, where all update deltas 148 are applied to a new consolidated base page P (as new state 144).

After several updates to a page, a delta chain is longer. Longer delta chains may eventually decrease search performance. According to an example embodiment, page consolidation may be performed that creates a new "re-organized" base page that includes the entries from the original base page along with the updates from the delta chain. Consolidation may be triggered if an accessor thread, during a page search, determines that a delta chain length has exceeded a system threshold. The thread may perform consolidation after it performs its update (or read) operation.

According to an example embodiment, the accessor thread performing consolidation may first create a new base page. The thread may then populate the base page with a sorted vector that includes the most recent version of a record from either the delta chain or old base page (e.g., deleted records may be discarded). The thread then installs the new address of the consolidated page in the mapping table. If it succeeds, the thread requests garbage collection of the old page state in order to free memory. FIG. 1d provides an example depicting the consolidation of page P 142, where all update deltas are applied to a new consolidated base page P (144). If the CAS to install the consolidated page fails, the thread abandons the operation by deallocating the new page. A subsequent accessor thread may eventually perform a successful consolidation.

A latch-free environment may not permit exclusive access to shared data structures (e.g., latch-free B-tree pages), as one or more readers may be active in a page state even as it is being updated. In such an environment, it may be unacceptable to deallocate memory still accessed by another thread. For example, during consolidation, a worker thread may "swap out" the old state of a page (e.g., delta chain plus base page) for a new consolidated state and may request that the old page state be garbage collected. However, care may be exercised so as not to deallocate the old page state while another worker still accesses it. In order to provide this safeguard, a thread may execute within an "epoch," as discussed further herein.

According to an example embodiment, it may be determined that a size of a page associated with the latch-free B-tree structure exceeds a predetermined maximal value threshold (238), as indicated in FIG. 2d.

According to an example embodiment, a split of at least one node of the latch-free B-tree structure that is associated with the page may be initiated. Initiating the split may include initiating a prepending of a split delta record to the node, wherein the split delta record includes a separator key value and a logical address corresponding to a side pointer associated with a sibling node that includes node data from the split node. A prepending of an index term delta record to a parent node of the node may be initiated, wherein the index term delta record includes a logical address corresponding to a pointer to the node, the separator key value, and a logical address corresponding to a pointer to the sibling node (240).

According to an example embodiment, splits may be triggered by an accessor thread that notices (e.g., after performing a search) that a page size is above a predetermined threshold. After installing its operation, the thread performs the split.

The latch-free B-tree 106 may employ a B-link atomic split type of installation technique that works in two phases, as discussed in P. L. Lehman and S. B. Yao, "Efficient Locking for Concurrent Operations on B-Trees," *TODS*, vol. 6, no. 4 (1981), pp. 650-670. The split may be atomically installed at the child (e.g., leaf) level. This may be referred to herein as "a half split." The parent node is atomically updated with the new index term that includes a new separator key and a pointer to the newly created split page. This process may continue recursively up the tree as necessary. The latch-free B-tree 106 allows the system to separate the split into two atomic actions, since the side link provides a valid search tree after installing the split at the child level.

To split a node P, the B-tree layer may first request that the cache layer allocate a new entry in the mapping table for a new node Q (the new split sibling of P). An appropriate separator key $K_p$ is determined from P that provides a balanced split and a new consolidated base state is generated for Q, that includes the records from P with keys greater than $K_p$. Page Q also includes a logical pointer to the former sibling of P (referred to herein as page R). The B-tree layer then calls the caching layer to install the physical address of Q's state in Q's mapping table entry. This installation may be done without a CAS, since Q is visible to only the split thread. FIG. 1e depicts this scenario, where a new sibling page Q 170 includes half the records of P 172, and (logically) points to page R 174, the former sibling of P 172. At this point, the original (unsplit) state of P 172 is still present in the indirect address mapping table 138, and Q 170 may be invisible to the rest of the index.

The split may be atomically installed by updating P 172 with a split delta record 176. This split delta 176 may include information such as: (1) the separator key $K_P$ used to invalidate all records within P 172 greater than $K_P$, since Q 170 now includes these records, and (2) a logical side pointer 178 to the new sibling Q 170. This installation completes the first "half split". FIG. 1f depicts such a scenario after prepending the split delta 176 to page P 172 pointing to its new sibling page Q 170. At this point, the index is valid, even without the presence of an index term for Q 170 in parent node O 180. Searches for a key included within Q 170 will first go to P 172. Upon encountering the split delta 176 on P 172, the search will traverse the side link 178 to Q 170 when the search key is greater than separator key K. Meanwhile, searches for keys less than the $K_P$ remain at P 172.

In order to direct searches directly to Q 170, an index term delta record 182 may be prepended to the parent of P 172 and Q 170 to complete the second half split. This index delta 182 may include (1) $K_P$, the separator key between P 172 and Q 170, (2) a logical pointer 186 to Q 170, and (3) $K_Q$, the separator key for Q 170 (formerly the separator directing searches to P 172). The path down the tree may be remembered (i.e. the PIDs of nodes on the path) and hence the parent may be identified. Most of the time, the remembered parent on the path will be the correct one and the posting may be completed quickly. Occasionally the parent may have been merged into another node. However, an example epoch mechanism may ensure that the appropriate state that will be visible to inform a user this has happened (i.e., the parent PID will not be a dangling reference). When this is detected, the tree is traversed upward to the grandparent node, etc., and a re-traversal down the tree is performed to find the parent that is "still alive".

Having $K_P$ and $K_Q$ present in the boundary key delta is an optimization that may improve search speed. Since searches may now traverse a delta chain on the index nodes, finding a boundary key delta in the chain such that a search key v is greater than $K_P$ and less than or equal to $K_Q$ allows the search to end instantly and follow the logical pointer down to Q 170. Otherwise, the search continues into the base page, which is searched with a simple binary search to find the correct pointer to follow. FIG. 1g depicts the current running split example after prepending the index entry delta 182 to parent page O 180, where a dashed line represents the logical pointer 186 to page Q 170.

Posting deltas may decrease latency when installing splits, relative to creating and installing completely new base pages. Decreasing latency may also decrease the chance of "failed splits", i.e., the case that other updates enter before attempts to install the split (and failures). However, split pages may be consolidated at a later point in time. For pages with containing split deltas, consolidation may involve creating a new base page that includes only records with keys less than the separator key contained in the delta. For index pages with index entry deltas, a new consolidated base page that includes the new separator keys and pointers may be generated.

According to an example embodiment, it may be determined that a size of a page associated with the latch-free B-tree structure is smaller than a predetermined low value threshold (242). According to an example embodiment, a merge of a node R of the latch-free B-tree structure that is associated with the page may be initiated (244). As shown in FIG. 1h, initiating the merge of the node R 188 may include initiating a prepending of a remove node delta record 189 to the node R 188, wherein the remove node delta record 189 indicates a removal of the node R 188. As shown in FIG. 1i, a prepending of a node merge delta record 191 to a left sibling node L 192 of the node R 188 may be initiated, wherein the node merge delta record 191 includes a physical address 193 of the contents of the node R 188. As shown in FIG. 1j, a prepending of an index term delete delta record 194 to a parent node P 195 of the node R 188 may be initiated, wherein the index term delete delta record 194 indicates a deletion of the node R 188 and an indication that the left sibling node L 192 of the node R 188 includes a key space of the node R (246).

Similar to node splits, node merges may be triggered when a thread encounters a node needing an SMO, in this case when the node is below some threshold size. The node merge SMO may be performed latch-free, but more atomic actions may be involved to accomplish the result.

The node R 188 to be merged (i.e., to be removed) may be updated with a remove node delta 189. This terminates further use of the node R 188. A thread encountering a remove node delta 189 in R 188 may read or update the contents of R 188 previously contained in R 188 by going to the left sibling L 192, into which R's data will be merged.

The left sibling L 192 of R 188 is updated with a node merge delta 191 that points (via a memory address 193) to the contents of R 188. The node merge delta 191 indicates that the contents of R 188 are to be included in L 192. Further, the node merge delta 191 points directly to this state of R 188, which is now logically considered to be part of L 192. This storage for R's state is now transferred to L 192 (except for the remove node delta 189 itself). The storage for the state of R 188 may be reclaimed when L 192 is consolidated. Thus, a linear list of storage representing a page state may be converted into a tree.

Further, when L 192 is now searched (L 192 is responsible for containing both its original key space and the key space that had been R's), the search may become a tree search which directs the accessing thread to either L's original page or to the page that it acquired from R 188 as a result of the merge. To enable this, the node merge delta 191 includes the separator key that enables the search to proceed to the correct data.

The parent node P 195 of R 188 may now be updated by deleting its index term associated with R 188. This may be done by posting an index term delete delta 194 that includes not only an indicator indicating that R 188 is being deleted, but also that L 192 will take on the key space formerly in R 188. The new range for L 192 may be explicitly included with a low key equal to L's prior low key and a high key equal to R's prior high key. As with node splits, this permits the system to recognize when a search may be directed to the newly changed part of the tree. Further, it enables searches that drop through all deltas to the base page to find the right index term by a simple binary search.

Once the index term delete delta 194 is posted, paths to R 188 are now blocked. At this point the process of reclaiming R's PID may be initiated. This may involve posting the PID to a pending delete list of PIDs for a currently active epoch. R's PID may not be recycled until other threads that might have encountered an earlier state of R 188 have exited from their latch-free B-tree 106 operation.

Figure 3A:
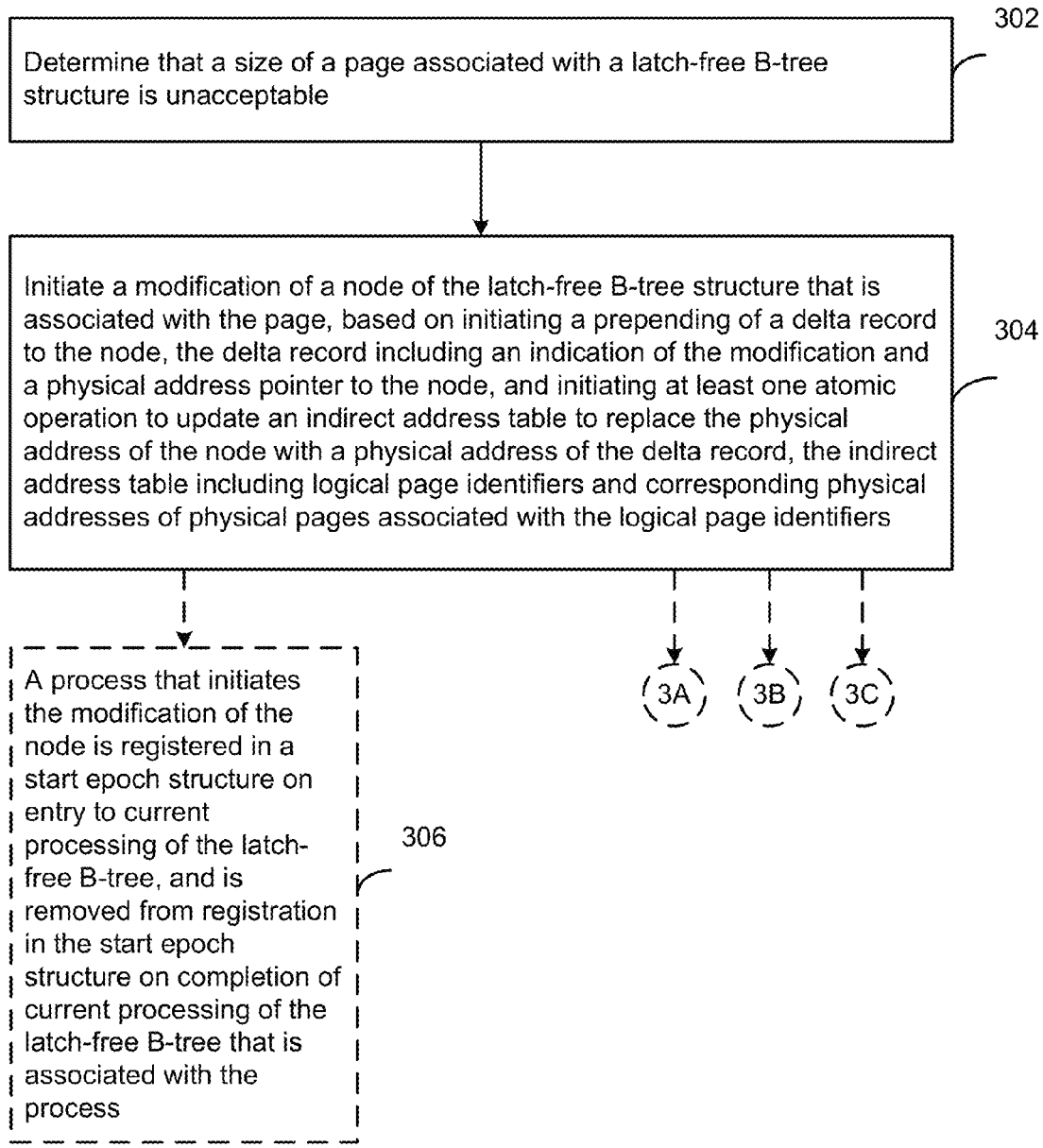
FIG. 3 is a flowchart illustrating example operations of the system of FIG. 1.

FIG. 3 is a flowchart illustrating example operations of the system of FIG. 1, according to example embodiments. In the example of FIG. 3a, it may be determined that a size of a page associated with a latch-free B-tree structure is unacceptable (302).

A modification of a node of the latch-free B-tree structure that is associated with the page may be initiated. The modification may be based on initiating a prepending of a delta record to the node, the delta record including an indication of the modification and a physical address pointer to the node, and initiating at least one atomic operation to update an indirect address table to replace the physical address of the node with a physical address of the delta record. The indirect address table may include logical page identifiers and corresponding physical addresses of physical pages associated with the logical page identifiers (304). For example, the indirect address table may include the indirect address mapping table 138, as discussed above.

According to an example embodiment, a process that initiates the modification of the node may be registered in a start epoch structure on entry to current processing of the latch-free B-tree, and may be removed from registration in the start epoch structure on completion of current processing of the latch-free B-tree that is associated with the process (306).

A latch-free environment may not permit exclusive access to shared data structures (e.g., latch-free B-tree pages), as one or more readers may be active in a page state even as it is being updated. In such an environment, it may not be acceptable to deallocate memory still accessed by another thread. For example, during consolidation, a worker thread may "swap out" the old state of a page (e.g., delta chain plus base page) for a new consolidated state and may request that the old page state be garbage collected. However, care may be exercised so as not to deallocate the old page state while another worker still accesses it. In order to provide this type of safeguard, a thread may execute within an "epoch".

Using epochs is an example technique for protecting memory being deallocated from being re-used too early, as discussed by H. T. Kung and P. L. Lehman, "Concurrent manipulation of binary search trees," *TODS*, vol. 5, no. 3 (1980), pp. 354-382. Generally, a thread, when it enters the tree, joins an execution "start epoch". Threads exit the epoch when an operation on the tree completes. Threads in a start epoch E might have encountered earlier versions of pages, whose states are being deallocated in active epoch E. However, a thread whose start epoch is E may not have seen such state deallocated in epoch E−1 because it had not yet started actively accessing the tree. Hence, once threads with start epoch E have completed ("drained"), it may be safe to recycle the objects deallocated in its epoch E.

When an accessor thread needs to mark a page for deallocation (e.g., the old page state after a successful consolidation), it calls a deallocation library that enqueues the physical page pointer on a latch-free queue associated with an epoch. Garbage collection may proceed on a background thread once the epoch has drained. This thread dequeues a page pointer from the queue and deallocates the entire delta chain and base page.

Figure 3B:
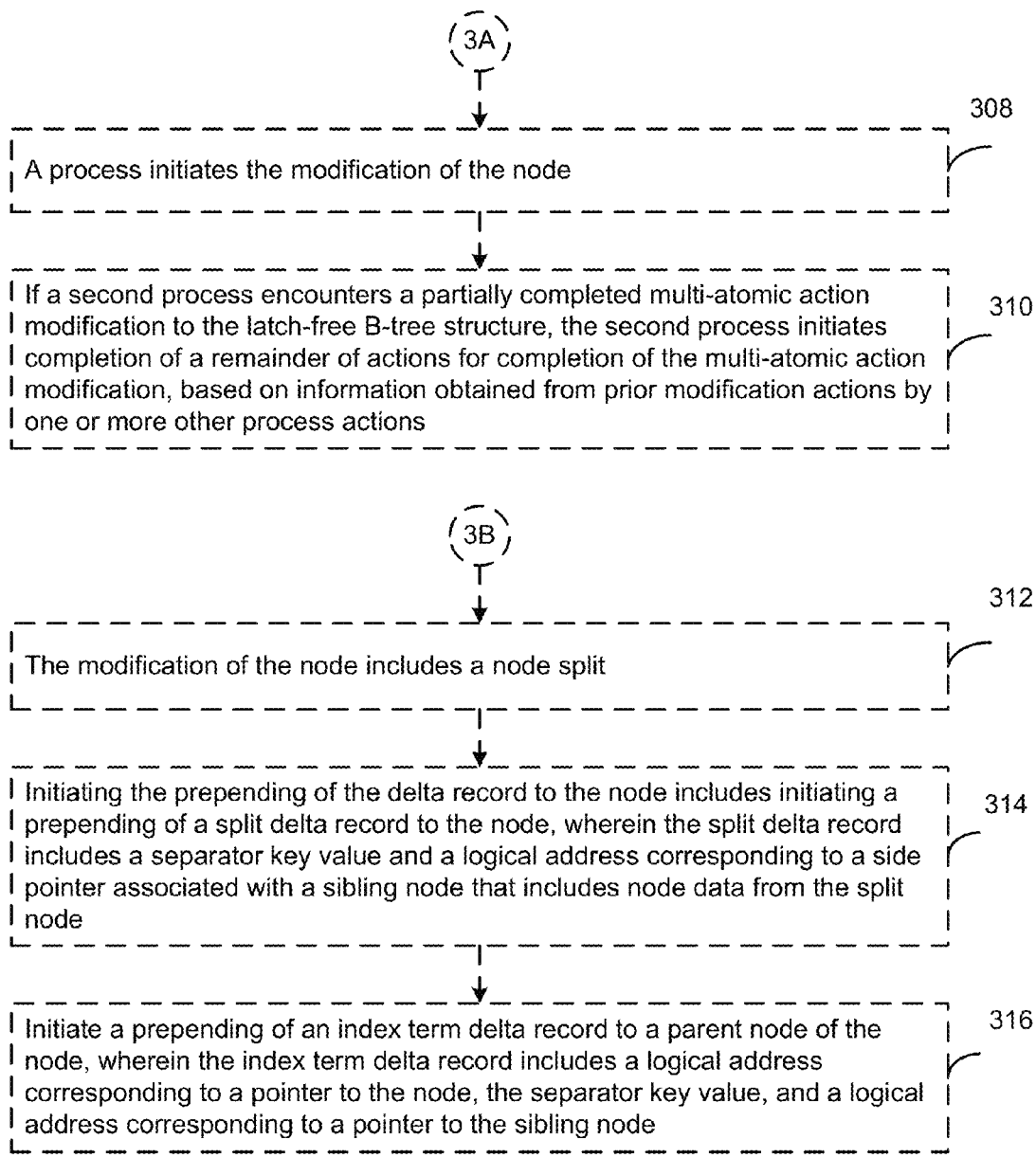

According to an example embodiment, a process may initiate the modification of the node (308), as indicated in FIG. 3b. If a second process encounters a partially completed multi-atomic action modification to the latch-free B-tree structure, the second process may initiate completion of a remainder of actions for completion of the multi-atomic action modification, based on information obtained from prior modification actions by one or more other process actions (310).

For example, a second thread, when seeing a partially completed multi-atomic action tree modification, may proceed to initiate the remainder of the steps, this being made possible by each step providing enough information for any thread to complete the entire structure modification.

For example, delta consolidation may be delayed until the tree structure modification is completed (all steps). Thus, a thread may be made aware that a structure modification is in progress and the delta records may capture the state that the thread may need to complete the multi-step tree modification. When the structure modification is complete, the threads may not "see" the deltas in a way that involves a need for the completion of the modification.

According to an example embodiment, the modification of the node may include a node split (312). Initiating the prepending of the delta record to the node may include initiating a prepending of a split delta record to the node, wherein the split delta record includes a separator key value and a logical address corresponding to a side pointer associated with a sibling node that includes node data from the split node (314).

A prepending of an index term delta record to a parent node of the node may be initiated, wherein the index term delta record includes a logical address corresponding to a pointer to the node, the separator key value, and a logical address corresponding to a pointer to the sibling node (316). For example, FIG. 1g illustrates operation of an example node split, as discussed above.

Figure 3C:
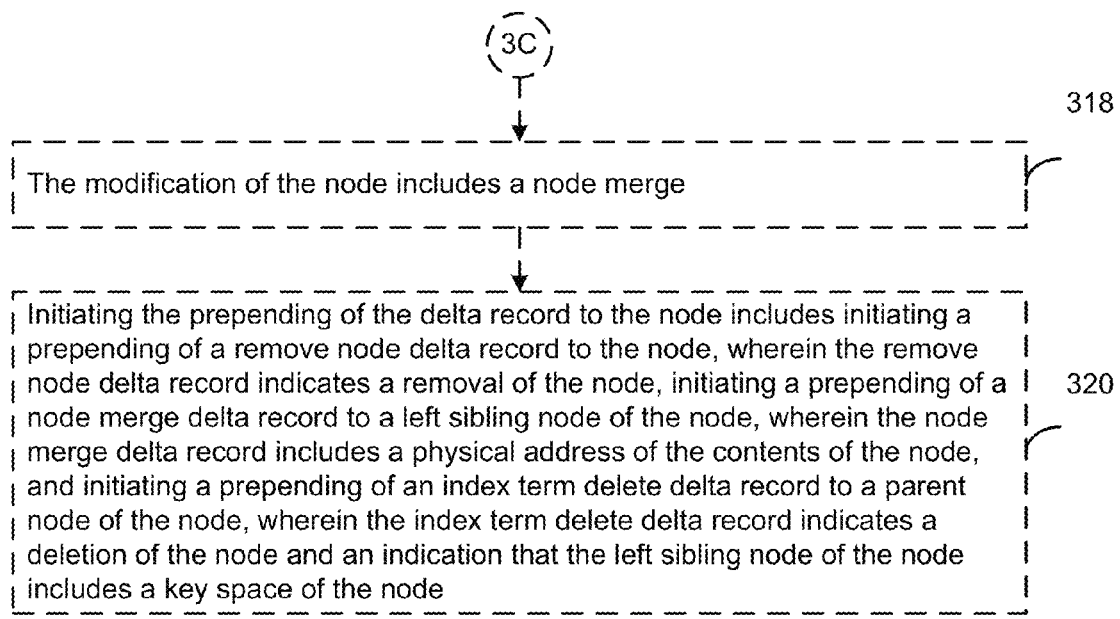

According to an example embodiment, the modification of the node may include a node merge (318), as indicated in FIG. 3c. Initiating the prepending of the delta record to the node may include initiating a prepending of a remove node delta record to a node R, wherein the remove node delta record indicates a removal of the node R. A prepending of a node merge delta record to a left sibling node L of the node R may be initiated, wherein the node merge delta record includes a physical address of the contents of the node R. A prepending of an index term delete delta record to a parent node P of the node R may be initiated, wherein the index term delete delta record indicates a deletion of the node R and an indication that the left sibling node L of the node R includes a key space of the node R (320), as discussed above.

According to an example embodiment, a log structured store, while nominally a page store, may use storage efficiently by mostly posting only page change deltas (one or a few records). For example, pages may eventually be made contiguous during an example "cleaning" (garbage collection) process.

Example techniques discussed herein exploit a latch-free approach. This approach may also involve the processor caches of multi-core chips. The latch-free B-tree may utilize an example architectural layering of access method on top of storage manager. According to an example embodiment, a storage manager may include a form of log structured store intended to work with flash storage. Experimental results have indicated that this approach produces good performance.

There has been recent discussion of No-SQL systems, which may be understood to include atomic record stores (ARSs), as discussed in "MongoDB," (http://www.mongod-b.org/). While some of these systems are intended as stand-alone products, it is also possible to include an atomic record store as a component of a more complete transactional system, given appropriate control operations, as discussed in J. J. Levandoski, D. B. Lomet, M. F. Mokbel, and K. Zhao, "Deuteronomy: Transaction Support for Cloud Data," *In CIDR* (2010), pp. 123-133. Indeed, with careful architectural componentization, one may regard a database system as including an atomic record store.

An ARS supports the reading and writing of individual records, each identified by a key. Further, a tree-based ARS also supports high performance key-sequential access to designated subranges of the keys. It is this combination of random and key-sequential access that has made B-trees a popular indexing technique within database systems.

However, an ARS is more than an access method, as it includes the management of stable storage and provides that updates be recoverable should there be a system crash. It is the performance of its ARS of this more inclusive form that is the foundation for the performance of any system in which the ARS is embedded, including full function database systems.

Example techniques discussed herein may provide an ARS that provides high performance.

Database systems have exploited the same storage and CPU infrastructure for more than a generation. That infrastructure has used disks for persistent storage. Further, it has used processors whose uni-processor performance increased with Moore's Law, thus limiting a need for high levels of concurrent execution within a "box". However, that environment has been changing. For example, current multi-core CPUs may involve high concurrency. Further, because of cache interference, locks, whether they are spin locks or latches, have larger negative aspects than previously. They may block more frequently, and even the non-blocking case incurs a high cache penalty, as discussed in A. Ailamaki, D. J. DeWitt, M. D. Hill, and D. A. Wood, "DBMSs on a Modern Processor: Where Does Time Go?" in VLDB (1999), pp. 266-277.

Further, acceptable multi-core processor performance may depend on successful exploitation of processor caches. Updates may result in cache line invalidations, so how and when updates are done may involve care in planning.

Example techniques discussed herein may use a latch-free approach when accessing latch-free B-tree pages in main memory. A latch-free approach may ensure threads are not abandoned to the operating system or re-directed when faced with conflicts. Further, example updates are "delta" updates that do not update pages in place, hence preserving previously cached lines of the page.

Latch-free techniques and state changes that avoid update-in-place may provide high main memory performance. For storage system performance, log structuring may be utilized, with flexible delta writing further contributing to storage efficiency and hence I/O performance. For example, this type of "design paradigm" may be applicable more widely to realize high performance data management systems.

Disk latency may be another obstacle to high performance. The small number of I/O ops per second associated with a disk may greatly hamper performance. For record centric (transactional) workloads, flash storage is more cost effective than disk for I/O operations per second. For example, AMAZON's DYNAMODB includes an explicit ability to exploit flash. Thus, flash storage may be used for an example ARS.

However, while flash has fast random and sequential reads, it may involve an erase cycle prior to writing, making random writes up to five times slower than sequential writes. While flash-based solid-state drives (SSDs) may have a mapping layer to hide this from users, custom designed log-structuring may avoid dependence on this, and may provide more acceptable write performance.

Figure 4:
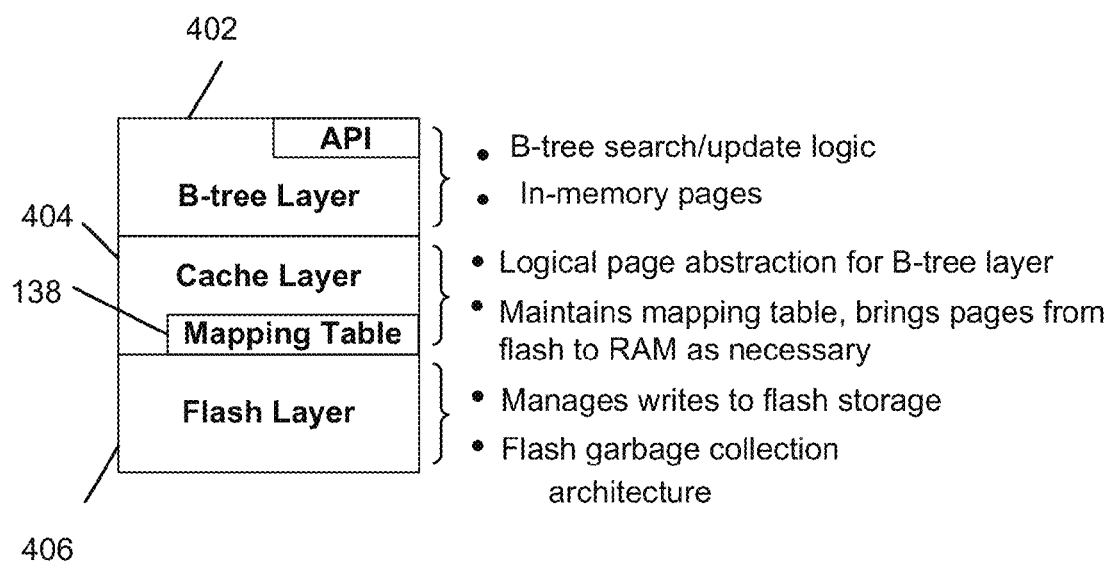
FIG. 4 is a block diagram of an example B-tree atomic record store architecture.

The latch-free B-tree shares several aspects with conventional B-trees, as described by R. Bayer and E. M. McCreight, "Organization and Maintenance of Large Ordered Indices," *Acta Informatica*, vol. 1, no. 1 (1972), pp. 173-189. For example, the latch-free B-tree may order and provide logarithmic time access to individual keyed records from a one-dimensional key range, while also supporting linear time access to sub-ranges. According to an example embodiment, an ARS may also be architected as illustrated in FIG. 4. An access method layer, or a B-tree Layer 402, is the top layer, as shown in FIG. 4. The B-tree Layer 402 interacts with a Cache Layer 404, which is the middle layer. An example cache manager may be built on top of a Storage Layer 406, which may support an example log structured flash store. According to example embodiments discussed herein, a log structured store may manage both flash and disk storage.

This design may be architecturally compatible with existing database kernels, while also being suitable as a standalone or Deuteronomy style ARS.

According to example embodiments discussed herein, threads processing externally generated requests rarely block. Eliminating latches is not the only technique used herein. For example, the write-ahead log protocol (WAL) may be enforced without blocking, as inappropriate updates may be removed from stable pages prior to a flush. For these threads, blocking may be used for fetching a page from stable storage, which may occur rarely when using a large main memory cache. This persistence of thread execution may help in preserving multi-core instruction caches, and in avoiding thread idle time and context switch costs.

Example techniques discussed herein may use a form of node state change delta updating which avoids update-in-place. Thus, updates may frequently avoid evicting data from processor data caches. Advantageous processor cache performance may increase the instructions executed per second by reducing cache misses. This may permit higher levels of the index and some data pages to persist for extended periods in the processor data cache.

As another example, performance of data management systems may be gated by I/O access rates. However, using flash storage may ease that disadvantage somewhat. However, when flash storage is attached as an I/O device (e.g., as an SSD), I/O access rates may be limiting. By using log structuring, writing large buffers, write bottle necks may be diminished. Flash storage's high random read access rates coupled with the large main memory page cache may substantially decrease blocking on reads.

As discussed herein, the Cache Layer 404 may maintain a mapping table that maps logical pages to physical pages. Logical page identifiers (PIDs) may be used in the latch-free B-tree 106 to link the nodes of the tree. Thus, between nodes, links may be PIDs, and not disk or memory addresses. The mapping table 138 may translate a PID into either the address of a page on stable storage, or the address of the page in memory. The example indirect address mapping table 138 may thus become a central location for managing example "paginated" storage.

Tree indexing in which nodes are linked together using physical locations, and in which every update changes the physical location, may involve updates cascading changes to the root of the tree. The example mapping table 138 severs the connection between physical location and inter-node links, and thus enables latch-free B-tree nodes 108 to be "relocated" on update, and when a page is written to stable storage, and without involving a propagation of the location change to the root of the tree. This "relocation" tolerance may enable both delta updating of the node in main memory and log structuring of stable storage.

At periodic intervals, pages may be re-organized (consolidated) to both reduce memory footprint and to improve search performance. A consolidated form of the page is also installed with a CAS, and the prior page structure is garbage collected safely using an epoch approach. A reference to the entire data structure for the page, including deltas, is placed on a pending list and all this space will be reclaimed when safe.

According to an example embodiment, a form of epoch may be used to accomplish safe garbage collection. Somewhat similar epoch techniques are discussed in P. L. Lehman and S. B. Yao, "Efficient Locking for Concurrent Operations on B-Trees," TODS, vol. 6, no. 4 (1981), pp. 650-670. Deallocated space and PIDs are placed on a pending list associated with an epoch until all threads in the old epoch have "drained". Once that occurs, there are no outstanding references to space or PIDs on this pending list, and full reclamation and reuse can occur.

Thus, delta updating may enable latch-free access in the latch-free B-tree 106 and preservation of processor data caches by avoiding update-in-place. The latch-free B-tree 106 indirect address mapping table 138 is an enabler of this example feature, for example, via its ability to isolate the effects of updates to a node to that node alone.

According to example embodiments discussed herein, latches are not used to protect parts of the example index tree during structure modifications (SMOs) such as page splits. For example, a page split may introduce changes to more than one page, the original overfull page O, the new page N that will receive half O's contents, and the parent index page P that points down to O, and that will subsequently point to both O and N. Thus, it is possible that a page split may not be installed using a single CAS.

To deal with this scenario, SMOs are broken into a number of atomic actions, each installable via a CAS. The latch-free B-tree 106 makes this easier, particularly for splits. With a side link in each page, a node split may be decomposed into two "half split" atomic actions.

For example, O may be split by first creating N and initializing it with the records of the upper half of the key range. N may be installed in a new entry of the mapping table, an entry that is not yet visible to the rest of the tree. O may then be logically split using a "split delta," this delta may be installed with a CAS. This ends the first half split and is done atomically.

An index term for N may be posted into P with a delta record, using a CAS. This is the second half split and is an atomic update to the index node.

Similar to a conventional storage manager, an example log structured store (LSS) storage manager may flushes pages, lazily while honoring the write-ahead log protocol when part of a larger transactional system, or by writing changes immediately when used as a stand-along record store. However, unlike a conventional storage manager, LSS may only flush the data change deltas that represent the changes made to the page since its previous flush.

Thus, the LSS flush activity may include marshaling the data change deltas into a contiguous form which may be referred to as a C-delta. Appended to the C-delta is a pointer that references the prior (base) page that is modified by the C-delta, thus reducing an amount of data that is written during a "page" flush, increasing the number of pages that fit within an example main memory I/O buffer, and hence reducing the number of PO's per page. There may be a penalty on reads, however, as the discontiguous parts of pages may all be read to bring a page into the main memory cache. According to example embodiments herein, the high random read performance of flash memory may contribute to ARS performance.

According to an example embodiment, LSS may clean (garbage collect) prior parts of flash that are the old parts of its log. The flushing of C-deltas may reduce a load on the LSS cleaner by reducing the amount of storage used per page. This reduces the "write amplification" that may be associated with log structuring. Further, during cleaning, LSS may make C-deltas and their base pages contiguous for improved access performance.

According to example embodiments discussed herein, at the leaf page level, updates (deltas) may include one of three types: (1) insert, representing a new record insert on the page; (2) update, representing an update to an existing record in the page; or (3) delete, representing the removal of an existing record in the page. Update deltas may include an LSN provided by the client issuing the update. For example, this LSN may be used for recovery and to enforce a write-ahead-log (WAL) protocol for a transactional log when the Bw-tree is used in a transactional system with a separate transaction log. Insert and update deltas may include a record representing the new payload, while delete deltas may include only the key of the record to be removed.

In the presence of delta chains, searching a leaf page may first involve a delta chain traversal. The search may terminate at the first occurrence of the search key in the delta chain. If the delta that includes the key represents an insert or update, the search succeeds and returns the record pointer. If the delta represents a delete, the search fails. If the key is not present in the delta chain, the search proceeds to the base page by performing a binary search within the page in B-tree fashion.

According to example embodiments discussed herein, a latch-free b-tree 106 implementation may assume that conflicting data update operations are prevented by concurrency control that is elsewhere in the system. For example, such concurrency control may reside in the lock manager of an integrated database system, or in a transactional component of a Deuteronomy system. As another example, arbitrary interleavings of concurrent updates may be enabled as by an atomic record store.

However, "inside" the latch-free B-tree, data updates may be serialized with SMOs and SMOs may be serialized with other SMOs. That is, a serial schedule may be generated for everything that occurs in the latch-free B-tree, where data updates and SMOs are treated as the units of atomicity.

For example, SMOs may be treated as atomic (e.g., when regarded as system transactions). This may be done without using latches that could conceal the fact that there are multiple steps involved in an SMO. For example, if a thread encounters an incomplete SMO, it may be comparable to encountering an uncommitted state. Being latch-free, the latch-free B-tree may not prevent this from happening. Thus, such a thread will complete and commit the SMO before it may either post its update or continue with its own SMO. For page splits, when an updater or another SMO would traverse a side pointer to reach the correct page, it will complete the split SMO by posting the new index term delta to the parent. Only then may it continue on to its own activity. This example technique may thus force the incomplete SMO to be "committed" and to serialize before the interrupted initial action of the thread.

For example, the same principle may be applied regardless of whether the SMO is a split or a node merge. For example, when deleting a node R, and the thread arrives at L and discovers that it is being deleted, the thread is encountering an in progress and incomplete earlier system transaction. The delete of R should serialize after the delete of L in this case. Hence the thread deleting R may first complete the delete of L. Only then may this thread complete the delete of R. This may lead to the processing of a stack of SMOs, but given the rarity of this scenario, it may occur rarely, and is reasonably straightforward to implement recursively.

According to example embodiments discussed herein, the cache layer 404 may be responsible for reading, flushing, and swapping out pages between memory and flash. It provides the abstraction of logical pages to the B-tree layer 402. For example, page updates may occur when the page exists in memory. The cache layer 404 may maintain the in-memory data structure for a page and may translate from logical page ids to memory addresses when requested. For this purpose, it may maintain a mapping table 138 that translates from logical page ids to physical locations which are either memory locations or flash locations. Updates to pages, including those involving page management operations such as split, flush, page swapout/swapin, and relocation on flash, may involve CAS operations on the mapping table 138 in the location indexed by the logical page id.

According to an example embodiment, the pages in main memory may be written to stable storage to expedite recovery after a crash. Page flushes may be initiated by a page swapout module configured to flush and swap out pages to reduce memory usage. For example, an LSS garbage collector may also initiate page writes when it may be desirable to copy over valid page records from the tail to the head of the LSS log on flash. With multiple modules (e.g., threads) writing records to flash, writes may be serialized within and across pages for operations for correct ordering. For example, logging during page splits may involve page flushes going to stable storage within a system transaction. Further, flushes to LSS may be coordinated with the WAL protocol in the presence of an external transactional component. Similar considerations may apply when the latch-free B-tree 106 is used as part of a database kernel.

Deuteronomy, discussed in J. J. Levandoski, D. B. Lomet, M. F. Mokbel, and K. Zhao, "Deuteronomy: Transaction Support for Cloud Data," *In CIDR* (2010), pp. 123-133, is an example of a cloud database architecture that has refactored a transactional system into a transactional component (TC) and a data component (DC). For example, the DC may provide atomic record operations but no transactional support. According to an example embodiment, the latch-free B-tree 106 is an example of a DC that may be plugged into Deuteronomy.

For example, record insert and update operations arriving from the TC to the DC may be tagged with a Log Sequence Number (LSN). This LSN may be recorded in the delta record appended to the page structure in memory for the respective operation in an example latch-free B-tree 106.

According to an example embodiment, to track which delta records have been flushed on a page, and to which location on flash, a flush delta record may be utilized. Flush delta records may aid in recording which changes to a page have been flushed so that subsequent flushes send only incremental page changes to stable storage. When a page flush succeeds, a delta record that includes the new flash offset and largest LSN that was flushed may be prepended to the page structure in RAM using a CAS.

According to an example embodiment, whenever the TC appends (flushes) to its write-ahead log (WAL), it updates the End of Stable Log (ESL) LSN value. ESL may include an LSN such that all lower valued LSNs are in the stable log at the TC. Periodically, it may send an updated ESL value to the DC. For example, for enforcing causality via the WAL protocol, the DC may not make durable operations that are greater than the last ESL update. For example, this may ensure that the DC is "running behind" the TC in terms of what has been made durable. To enforce this rule, page records that have LSNs larger than the ESL may not be flushed to the LSS.

Page flushes in the DC may be explicitly required by the TC when it advances a Redo-Scan-Start-Point (RSSP). When the TC Advances the RSSP and sends it to the DC, its intent may be for this to permit the TC to truncate the portion of the log before RSSP. The TC may then wait for an acknowledgement from the DC indicating that the DC has made all updates with LSNs≤RSSP stable. Because of the stability of results of these operations, the TC may no longer need to send these operations to the DC during redo recovery. For the DC to comply, it may flush the records on pages that have LSN's≤RSSP before it acknowledges to the TC.

According to an example embodiment, to enable logging of page splits to work correctly with an ESL bound for flushing, the delta record (corresponding to the separator key) which is pushed up to the parent of the split page may be assigned an LSN equal to the current ESL. Further, page consolidations may not consolidate delta records that have an LSN higher than the current ESL. During page consolidation, the reorganized base page may be assigned an LSN equal to that of the highest LSN of the delta records from which it is consolidated. For example, this may satisfy the base page LSN (PLSN) being greater than or equal to the LSN of updates that it includes. Further, any update to the page with LSN less than PLSN may be included in the base page. Thus, PLSN may be used to provide idempotence for redo recovery.

According to an example embodiment, the LSS may provide a large buffer into which the cache manager posts pages and system transactions describing example latch-free B-tree structure 106 modifications. According to an example embodiment, a cache manager may prepare pages for flushing, as discussed below.

According to an example embodiment, the cache manager may marshall the bytes from the pointer representation of the page in main memory into a linear representation that may be written to the flush buffer. The page state may be captured at the time it is intended to be flushed. For example, later updates might violate the WAL protocol or a page split may have removed records that need to be captured in LSS. For example, the page may be split and consolidated while an earlier flush request for it is being posted to the flush buffer. If the bytes for the earlier flush are marshalled after the split has removed the upper order keys in the pre-split page, the version of the page captured in the LSS may not have these records. Should the system crash before the rest of the split itself is flushed, those records may be lost. When marshalling records on a page for flush, multiple delta records may be consolidated into a C-delta so that they appear contiguously in LSS.

According to an example embodiment, when flushing a page, the cache manager may only marshall those delta records which have an LSN between the previously flushed largest LSN on that page and the current ESL value. The previously flushed largest LSN information may be included in the latest flush delta record on the page.

According to an example embodiment, incremental flushing of pages may imply that the LSS consumes significantly less storage for a page than is the case for full page flushing. This may be advantageous for a log structured store such as LSS, as a flush buffer may hold far more "pages" than if the entire state of every page were flushed, thus increasing the writing efficiency on a per page basis. Further, an example log structured store cleaner (e.g., garbage collector) may not work as hard since storage is not being consumed as fast, thus reducing the execution cost per page for the cleaner. It may also reduce the "write amplification" (e.g., a result in which pages not changed when the cleaner encounters them may be re-written).

According to an example embodiment, a flush buffer may aggregate writes to LSS up to a configurable threshold (e.g., 1 MB) and reduce I/O overhead. It may use ping-pong (double) buffers and alternates between them with asynchronous I/O calls to the LSS so that the buffer for the next batch of page flushes may be prepared while the current one is in progress.

After the pages are written to a flush buffer, the states of the respective pages may be updated in the mapping table 138. For example, the result of the flush may be captured in the mapping table 138 via a flush delta describing the flush, which may be prepended to the state and installed via a CAS as with other deltas. If the flush has captured all the updates to the page, the page may be "clean," in that there are no uncaptured updates not in the LSS.

According to an example embodiment, the cache manager monitors the memory used by the latch-free B-tree, and when it exceeds a configurable threshold, it may attempt to swap out pages to the LSS. Once a page is clean, it may be evicted from the cache. The storage for the state of an evicted page may be posted to the pending list for a current epoch so that it may be recycled once the epoch changes and the current epoch "drains", as no thread may any longer see this state.

Experiments have been conducted to evaluate the performance of the example latch-free B-tree structure 106. For example, the example latch-free B-tree structure 106 has been compared with a BERKELEYDB system designed for paging to/from a hard disk. Example experiments used a mix of real-world and synthetic workloads running on real system implementations.

For example, a Bw-Tree has been implemented as a standalone atomic record store (or DC) in approximately 10,000 lines of C++ code. For example, the WIN32 native INTERLOCKEDCOMPAREEXCHANGE64 has been used to perform the CAS update installation. An example implementation was latch-free.

For example, an experiment machine included an INTEL CORE 2 DUO (at 3.16 GHz) with 24 GB of RAM and a 160 GB FUSION IO flash SSD drive. The machine includes four native cores that hyperthreaded to eight logical cores in the experiments. For example, thread affinity may be used to place all Bw-tree background worker threads on a single core (e.g., RAM and flash garbage collector threads, flush thread, and page swapout thread).

For example, in comparing the Bw-tree to the BERKELEYDB key-value database, BERKELEYDB demonstrated good performance as a standalone storage engine, meaning data does not need to traverse a query processing layer as done in a full database. The C implementation was used, of BERKELEYDB running in B-tree mode, which includes a standalone B-tree index residing over a buffer pool cache that reads and writes from disk at page granularity, representing a typical B-tree architecture. For example, BERKELEYDB was utilized in non-transactional mode (e.g., to obtain better performance) that supports a single writer and multiple readers with page-level latching (e.g., at a lowest latch granularity, in BERKELEYDB) to maximize concurrency. In example experiments, in-memory buffer pool size of BERKELEYDB was set to the same amount of memory allotted to the Bw-tree.

The experiments used three workloads, two from real-world applications and one synthetic.

For example, an XBOX LIVE workload included approximately 27 Million get-set operations obtained from MICROSOFT'S XBOX LIVE PRIMETIME online multiplayer game. For this example, keys were alpha-numeric strings averaging 94 bytes with value payloads averaging 1200 bytes. The read-to-write ratio is approximately 7.5 to 1.

For example, a storage deduplication trace workload was derived from a real enterprise deduplication trace used to generate a sequence of chunk hashes for a root file directory, and computed the number of deduplicated chunks and storage bytes. This trace included approximately 27 Million total chunks and 12 Million unique chunks, and had a read to write ratio of 2.2 to 1. For this example, keys were 20-byte SHA-1 hash values that uniquely identified a chunk, while the value payload included a 44-byte metadata string. Both the XBOX and deduplication workloads used lexicographical key comparison.

As another example, a synthetic data set was used that generated 32-bit integer keys, with a data payload of a 32-bit integer. The workload begins with an index of 1M entries generated using a uniform random distribution, and performs 42 million operations with a read to write ratio of 5 to 1 (in between the XBOX and deduplication workloads).

As used in the experimental testing, a performance metric includes throughput measured in (Million) operations per second. For example, the Bw-tree page size (i.e, the "rough" maximum size for a page before it splits) was set to 2K, 4K, and 32K for the synthetic, deduplication, and XBOX workloads respectively. These numbers were obtained through several tuning experiments (omitted) that demonstrated the best performance for each workload. The BERKELEYDB page size was tuned for the best performance on each workload as well. Eight worker threads were utilized for each workload, equal to the number of logical cores on an example experiment machine.

Experiments have been run, for example, over the XBOX and synthetic workloads for varying delta chain length thresholds, i.e., the "rough" maximum length a delta chain may grow before consolidating the page. For example, experiments indicated a general trend of inferior performance for very small delta lengths of around two. For these small lengths, consolidation occurs frequently, increasing the overhead for many of the update operations that perform consolidation. This overhead may deteriorate overall performance for these cases.

For the synthetic workload, performance peaked for a delta chain length of around 11, while for the XBOX LIVE workload, performance peaked around a length of 4. For the XBOX workload, search deteriorated quickly if a long sequential scan of a delta chain is involved. Sequential scans over linked delta chains appeared advantageous for branch prediction and prefetching. However, the XBOX workload apparently experienced peak performance at delta lengths of 4 since it has 1300-byte records and fewer deltas will fit into the L1 cache on a scan. Meanwhile, the synthetic workload included small 64-bit records, which may be more amenable to sequential scans. Thus, it may be possible that delta chain lengths for the synthetic workload may grow longer without significant performance consequences.

The XBOX LIVE, storage deduplication, and synthetic workloads were run on BERKELEYDB and the Bw-tree using a large memory setting and a small memory setting. For example, the large setting adjusts memory to allow each workload to operate completely in memory, while the small setting lowers the memory allocated to each index to cause roughly half of the data leaf pages (and all index pages) to remain in memory.

According to experimental results, for the large-memory mode, the Bw-tree exhibited a throughput of 2.19M operations/second, while BERKELEYDB demonstrated a throughput of 555K operations/second, representing a speedup of four times. For example, the Bw-tree includes latch-free features, as discussed herein. Meanwhile, BERKELEYDB involves page-level latches blocking readers during insert, which may reduce concurrency. For small-memory mode, a slowdown was experienced in the performance of both indexes. However, the Bw-tree demonstrated a performance speedup of 5.5× over BERKELEYDB (higher than the large-memory mode). For example this improvement in relative speedup may be a result of the Bw-tree's flash optimization (e.g., log-structuring, sequential writes to flash). Meanwhile, BERKELEYDB performed in-place updates on pages, translating to random writes to flash.

According to experimental results, for the storage deduplication workload, the Bw-tree exhibited a throughput of 1.06M operations/second for the large-memory run, which represented a 3.22× speedup over BERKELEYDB. For the small-memory run, the Bw-tree throughput dropped to 676K operations/second. This throughput drop for the Bw-tree may be more significant than the XBOX LIVE workload. For example, this may be attributed to the lower read-to-update ratio of the deduplication workload (2.2:1 compared to 8:1). More updates may imply more splits will occur, increasing the chance that multiple threads will attempt to split the same page. With more threads experiencing the latency involved in a split (including marshaling page state onto the flush queue), the throughput may drop. However, Bw-tree speedup over BERKELEYDB increased to 4.73×; again due to flash optimizations. The synthetic workload demonstrated the same trend as both of the real workloads, with speedup of the Bw-Tree rising from 2.1× to 3.9× over BERKELEYDB when going from the large-memory to small-memory runs.

According to experimental results, the performance of the Bw-tree was observed as the number of threads performing the workload increased. For all workloads, an increase in performance was observed in moving from one to four threads. This may be expected as the experiment machine has four cores. Experimental speedup was just short of linear since four background maintenance threads (RAM and Flash garbage collection, page swap, and flush thread) periodically woke up and performed work. Speedup past eight threads (the number of logical cores in the machine) starts to flatten out but still improves up to 64 threads. An explanation for this behavior may be that some threads may be scheduled out while performing expensive consolidates and splits. In their place, new threads are scheduled that update pages and do not subsequently perform consolidates nor splits, improving overall throughput. Eventually, past 64 threads, the overhead of context switching may have prevented performance improvement.

Given the latch-free nature of the Bw-tree, some operations may inevitably fail, e.g., competing threads trying to install an update on the same page simultaneously. For example, the Bw-tree was experimentally instrumented with counters to measure the failure rate of record updates, splits, and consolidates. Table 1 shown below provides the failure rate for each of these operations for each workload (e.g., using the large-memory run). The record update failure rate (e.g., inserts, updates, deletes) appears low, below 0.02% for all workloads. Thus, few updates may encounter increased latency due to retry.

TABLE 1

|        | Failed Splits | Failed Consolidates | Failed Updates |
|--------|---------------|---------------------|----------------|
| Dedup  | 0.25%         | 1.19%               | 0.0013%        |
| XBOX   | 1.27%         | 0.22%               | 0.0171%        |
| Synthetic | 8.88%      | 7.35%               | 0.0003%        |

Meanwhile, the failure rates for the split and consolidate operations appear larger than the update failures at around 1.25% for both the XBOX and deduplication workloads, and 8.88% for the synthetic workload. This may be expected, since splits and consolidates compete with the faster record update operations. However, these rates may be manageable.

To test the overhead of flash garbage collection configured the Bw-tree was configured to keep flash storage to approximately 40% of the XBOX dataset set size. This setting may represent an exceptional case where the flash garbage collection activity is consistently high. Thus, flash recycling may be expected to tax overall system performance. According to experimental results, heavy flash recycling introduced approximately a 10% performance hit.

One skilled in the art of data processing will understand that there are many ways of designing and implementing techniques associated with the Bw-tree, without departing from the spirit of the discussion herein.

Figure 5A:
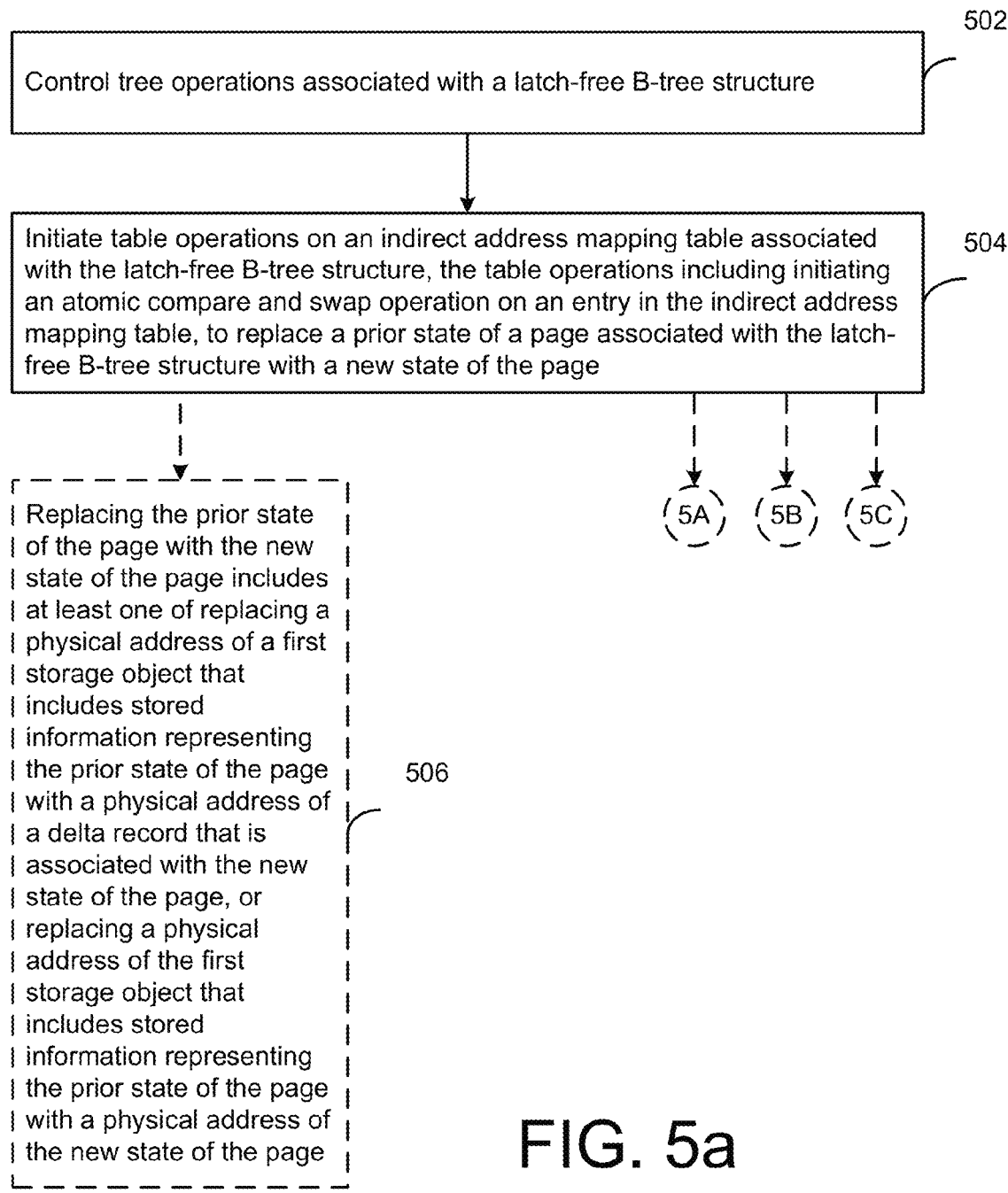
FIG. 5 is a flowchart illustrating example operations of the system of FIG. 1.
Figure 5B:
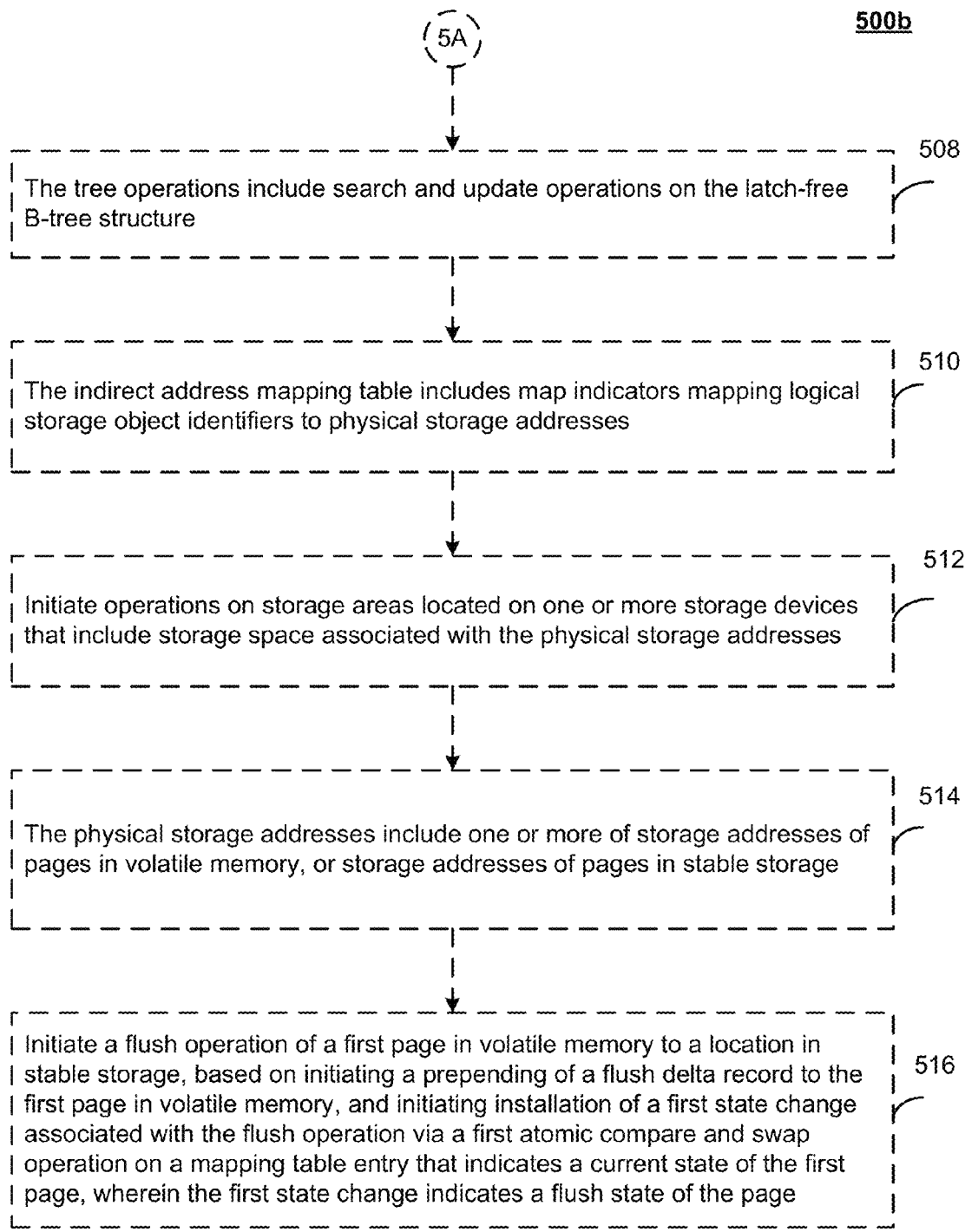

FIG. 5 is a flowchart illustrating example operations of the system of FIG. 1, according to example embodiments. In the example of FIG. 5a, tree operations associated with a latch-free B-tree structure may be controlled via a tree manager (502). For example, the tree manager 104 may be configured to control tree operations associated with a latch-free B-tree structure 106, as discussed above.

Table operations on an indirect address mapping table associated with the latch-free B-tree structure may be initiated. The table operations may include initiating an atomic compare and swap operation on an entry in the indirect address mapping table, to replace a prior state of a page associated with the latch-free B-tree structure with a new state of the page (504). For example, the map table manager 134 may be configured to determine, via a device processor 136, table operations on an indirect address mapping table 138 associated with the latch-free B-tree structure 106, as discussed above.

According to an example embodiment, replacing the prior state of the page with the new state of the page may include at least one of replacing a physical address of a first storage object that includes stored information representing the prior state of the page with a physical address of a delta record that is associated with the new state of the page, or replacing a physical address of the first storage object that includes stored information representing the prior state of the page with a physical address of the new state of the page (506).

According to an example embodiment, the tree operations may include search and update operations on the latch-free B-tree structure (508), as indicated in FIG. 4b.

According to an example embodiment, the indirect address mapping table may include map indicators mapping logical storage object identifiers to physical storage addresses (510).

According to an example embodiment, operations on storage areas located on one or more storage devices that include storage space associated with the physical storage addresses may be initiated (512). For example, the storage manager 156 may be configured to initiate operations on storage areas located on one or more storage devices 158 that include storage space associated with the physical storage addresses 154, as discussed above.

According to an example embodiment, the physical storage addresses may include one or more of storage addresses of pages in volatile memory, or storage addresses of pages in stable storage (514).

According to an example embodiment, a flush operation of a first page in volatile memory to a location in stable storage may be initiated, based on initiating a prepending of a flush delta record to the first page in volatile memory, and initiating installation of a first state change associated with the flush operation via a first atomic compare and swap operation on a mapping table entry that indicates a current state of the first page, wherein the first state change indicates a flush state of the page (516). For example, the storage manager 156 may be configured to initiate a flush operation of a first page 142 in volatile memory to a location in stable storage, based on initiating a prepending of a flush delta record 160 to the first page 142 in volatile memory, and initiating installation of a first state change 162 associated with the flush operation via a first atomic compare and swap operation on a mapping table entry that indicates a current state 164 of the first page 142, wherein the first state change 162 indicates a flush state of the page 142, as discussed above.

Figure 5C:
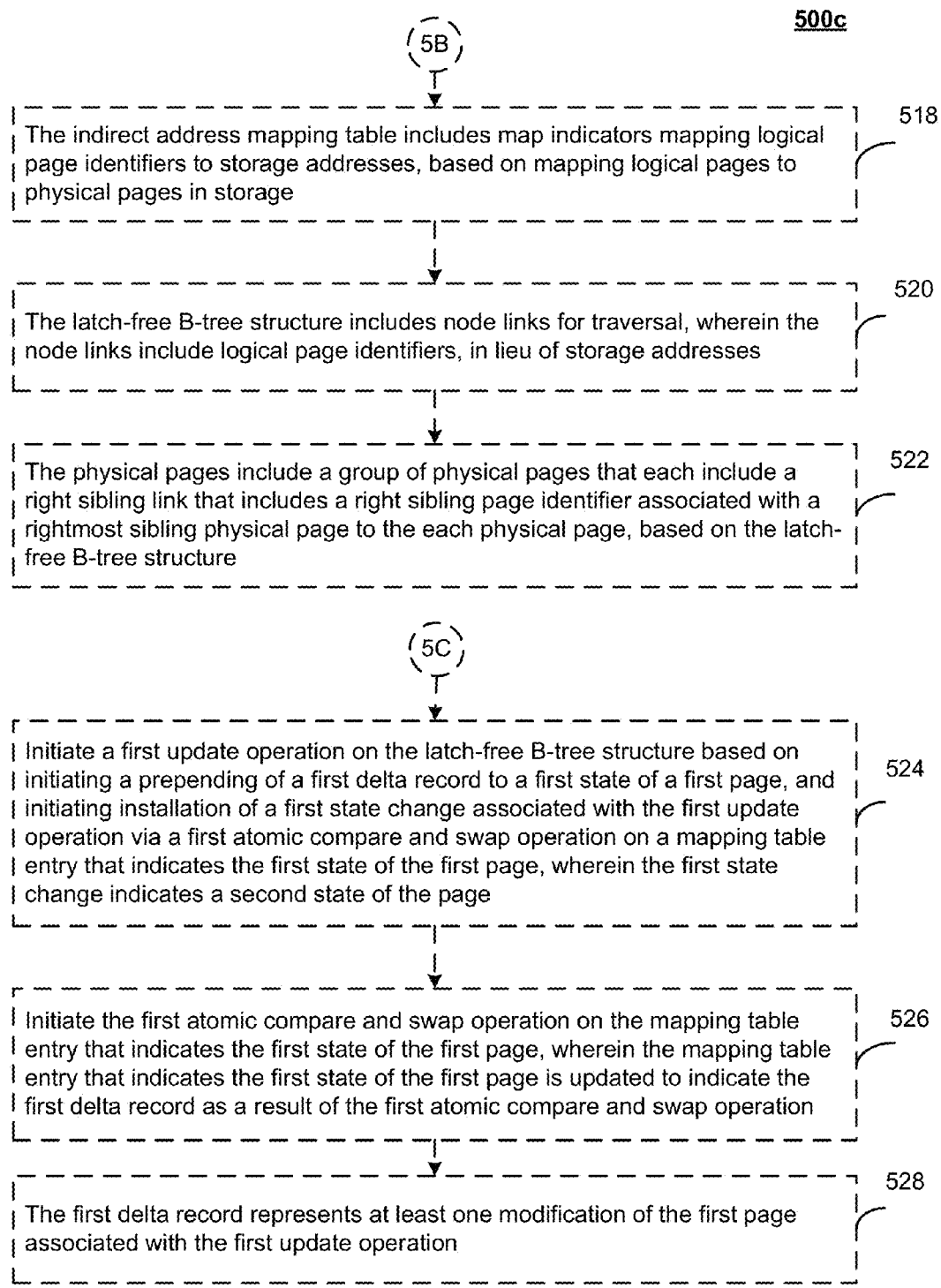

According to an example embodiment, the indirect address mapping table may include map indicators mapping logical page identifiers to storage addresses, based on mapping logical pages to physical pages in storage (518), as indicated in FIG. 5c.

According to an example embodiment, the latch-free B-tree structure may include node links for traversal, wherein the node links include logical page identifiers, in lieu of storage addresses (520).

According to an example embodiment, the physical pages may include a group of physical pages that may each include a right sibling link that includes a right sibling page identifier associated with a rightmost sibling physical page to the physical page, based on the latch-free B-tree structure (522).

According to an example embodiment, a first update operation on the latch-free B-tree structure may be initiated based on initiating a prepending of a first delta record to a first state of a first page, and initiating installation of a first state change associated with the first update operation via a first atomic compare and swap operation on a mapping table entry that indicates the first state of the first page. The first state change may indicate a second state of the page (524). For example, the tree manager 104 may be configured to initiate a first update operation on the latch-free B-tree structure 106 based on initiating a prepending of a first delta record 148 to a first state of a first page 142 (e.g., the prior state 140), and initiating installation of a first state change 162 associated with the first update operation via a first atomic compare and swap operation on a mapping table entry that indicates the first state of the first page 142, wherein the first state change indicates a second state of the page 142 (e.g., the new state 144), as discussed above.

According to an example embodiment, the first atomic compare and swap operation on the mapping table entry that indicates the first state of the first page may be initiated, wherein the mapping table entry that indicates the first state of the first page is updated to indicate the first delta record as a result of the first atomic compare and swap operation (526). The first delta record may represent at least one modification of the first page associated with the first update operation (528). For example, the map table manager 134 may be configured to initiate the first atomic compare and swap operation on the mapping table entry that indicates the first state of the first page 142, wherein the mapping table entry that indicates the first state of the first page 142 is updated to indicate the first delta record 148 as a result of the first atomic compare and swap operation, as discussed above.

Customer privacy and confidentiality have been ongoing considerations in data processing environments for many years. Thus, example techniques for using B-tree storage may use user input and/or data provided by users who have provided permission via one or more subscription agreements (e.g., "Terms of Service" (TOS) agreements) with associated applications or services associated with structured B-tree storage. For example, users may provide consent to have their input/data transmitted and stored on devices, though it may be explicitly indicated (e.g., via a user accepted text agreement) that each party may control how transmission and/or storage occurs, and what level or duration of storage may be maintained, if any.

Implementations of the various techniques described herein may be implemented in digital electronic circuitry, or in computer hardware, firmware, software, or in combinations of them (e.g., an apparatus configured to execute instructions to perform various functionality). Implementations may be implemented as a computer program embodied in a propagated signal or, alternatively, as a computer program product, i.e., a computer program tangibly embodied in an information carrier, e.g., in a machine usable or machine readable storage device (e.g., a magnetic or digital medium such as a Universal Serial Bus (USB) storage device, a tape, hard disk drive, compact disk, digital video disk (DVD), etc.), for execution by, or to control the operation of, data processing apparatus, e.g., a programmable processor, a computer, or multiple computers. A computer program, such as the computer program(s) described above, can be written in any form of programming language, including compiled, interpreted, or machine languages, and can be deployed in any form, including as a stand-alone program or as a module, component, subroutine, or other unit suitable for use in a computing environment. The computer program may be tangibly embodied as executable code (e.g., executable instructions) on a machine usable or machine readable storage device (e.g., a computer-readable medium). A computer program that might implement the techniques discussed above may be deployed to be executed on one computer or on multiple computers at one site or distributed across multiple sites and interconnected by a communication network.

Method steps may be performed by one or more programmable processors executing a computer program to perform functions by operating on input data and generating output. The one or more programmable processors may execute instructions in parallel, and/or may be arranged in a distributed configuration for distributed processing. Example functionality discussed herein may also be performed by, and an apparatus may be implemented, at least in part, as one or more hardware logic components. For example, and without limitation, illustrative types of hardware logic components that may be used may include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Processors suitable for the execution of a computer program include, by way of example, both general and special purpose microprocessors, and any one or more processors of any kind of digital computer. Generally, a processor will receive instructions and data from a read only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT), liquid crystal display (LCD), or plasma monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback. For example, output may be provided via any form of sensory output, including (but not limited to) visual output (e.g., visual gestures, video output), audio output (e.g., voice, device sounds), tactile output (e.g., touch, device movement), temperature, odor, etc.

Further, input from the user can be received in any form, including acoustic, speech, or tactile input. For example, input may be received from the user via any form of sensory input, including (but not limited to) visual input (e.g., gestures, video input), audio input (e.g., voice, device sounds), tactile input (e.g., touch, device movement), temperature, odor, etc.

Further, a natural user interface (NUI) may be used to interface with a user. In this context, a "NUI" may refer to any interface technology that enables a user to interact with a device in a "natural" manner, free from artificial constraints imposed by input devices such as mice, keyboards, remote controls, and the like.

Examples of NUI techniques may include those relying on speech recognition, touch and stylus recognition, gesture recognition both on a screen and adjacent to the screen, air gestures, head and eye tracking, voice and speech, vision, touch, gestures, and machine intelligence. Example NUI technologies may include, but are not limited to, touch sensitive displays, voice and speech recognition, intention and goal understanding, motion gesture detection using depth cameras (e.g., stereoscopic camera systems, infrared camera systems, RGB (red, green, blue) camera systems and combinations of these), motion gesture detection using accelerometers/gyroscopes, facial recognition, 3D displays, head, eye, and gaze tracking, immersive augmented reality and virtual reality systems, all of which may provide a more natural interface, and technologies for sensing brain activity using electric field sensing electrodes (e.g., electroencephalography (EEG) and related techniques).

Implementations may be implemented in a computing system that includes a back end component, e.g., as a data server, or that includes a middleware component, e.g., an application server, or that includes a front end component, e.g., a client computer having a graphical user interface or a Web browser through which a user can interact with an implementation, or any combination of such back end, middleware, or front end components. Components may be interconnected by any form or medium of digital data communication, e.g., a communication network. Examples of communication networks include a local area network (LAN) and a wide area network (WAN), e.g., the Internet.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A system comprising:
   at least one hardware device processor;
   a structured data manager tangibly embodied via executable instructions stored on a machine readable storage device for execution by the at least one hardware device processor, the structured data manager including:
   a tree manager that, when executed, controls tree operations associated with latch-free updates associated with a latch-free B-tree structure; and
   a map table manager that, when executed, initiates table operations on an indirect address mapping table associated with the latch-free B-tree structure, the table operations including initiating an atomic compare and swap operation on an entry in the indirect address mapping table, to replace a prior state of a page associated with the latch-free B-tree structure with a new state of the page.

2. The system of claim 1, wherein replacing the prior state of the page with the new state of the page includes at least one of:
   replacing a physical address of a first storage object that includes stored information representing the prior state of the page with a physical address of a delta record that is associated with the new state of the page, or
   replacing a physical address of the first storage object that includes stored information representing the prior state of the page with a physical address of the new state of the page.

3. The system of claim 1, wherein:
   the tree operations include search and update operations on the latch-free B-tree structure, and
   the indirect address mapping table includes map indicators mapping logical storage object identifiers to physical storage addresses, wherein:
   the system further comprises a storage manager that, when executed, initiates operations on storage areas located on one or more storage devices that include storage space associated with the physical storage addresses, wherein the physical storage addresses include one or more of:
   storage addresses of pages in volatile memory, or
   storage addresses of pages in stable storage.

4. The system of claim 3, wherein:
   the storage manager is configured to initiate a flush operation of a first page in volatile memory to a location in stable storage, based on:
   initiating a prepending of a flush delta record to the first page in volatile memory, and
   initiating installation of a first state change associated with the flush operation via a first atomic compare and swap operation on a mapping table entry that indicates a current state of the first page, wherein the first state change indicates a flush state of the page.

5. The system of claim 1, wherein:
   the indirect address mapping table includes map indicators mapping logical page identifiers to storage addresses, based on mapping logical pages to physical pages in storage,
   the latch-free B-tree structure includes node links for traversal, wherein the node links include logical page identifiers, in lieu of storage addresses, and
   the physical pages include a group of physical pages that each include a right sibling link that includes a right sibling page identifier associated with a rightmost sibling physical page to the each physical page, based on the latch-free B-tree structure.

6. The system of claim 1, wherein:
the tree manager is configured to initiate a first update operation on the latch-free B-tree structure based on initiating a prepending of a first delta record to a first state of a first page, and initiating installation of a first state change associated with the first update operation via a first atomic compare and swap operation on a mapping table entry that indicates the first state of the first page, wherein the first state change indicates a second state of the page; and
the map table manager is configured to initiate the first atomic compare and swap operation on the mapping table entry that indicates the first state of the first page, wherein the mapping table entry that indicates the first state of the first page is updated to indicate the first delta record as a result of the first atomic compare and swap operation, wherein the first delta record represents at least one modification of the first page associated with the first update operation.

7. A method comprising:
obtaining a request to modify an object in storage that is associated with one or more computing devices, the storage organized based on a latch-free B-tree structure that is updated via latch-free updates;
determining, via a hardware device processor, a storage address of the object, based on accessing a mapping table that includes map indicators mapping logical object identifiers to physical storage addresses;
initiating a prepending of a first delta record to a prior object state of the object, the first delta record indicating an object modification associated with the obtained request; and
initiating installation of a first state change associated with the object modification via a first atomic operation on a mapping table entry that indicates the prior object state of the object.

8. The method of claim 7, wherein:
a process initiates the installation of the first state change, and
if the installation of the first state change fails:
the process retries initiating the installation of the first state change, if the first state change includes an update to an object in storage, or
the installation of the first state change is retried lazily, if the first state change includes one or more of a modification to the latch-free B-tree structure or a flush of a page from volatile storage to stable storage.

9. The method of claim 7, wherein:
a process initiates the installation of the first state change, and
if the process encounters an incomplete modification operation on the latch-free B-tree structure, the process initiates completion of the incomplete modification prior to completion of the installation of the first state change.

10. The method of claim 7, wherein:
the first delta record represents a first modification of the object associated with the request,
the first delta record includes a link that includes a physical address associated with the prior object state of the object, and
the installation of the first state change includes installation of a physical storage address of the first delta record to replace a physical storage address of the prior object state of the object.

11. The method of claim 7, wherein:
the first atomic operation includes a compare and swap (CAS) operation.

12. The method of claim 7, further comprising: obtaining a second request to modify the object;
determining, via a hardware device processor, the storage address of the object, based on accessing the mapping table;
initiating a prepending of a second delta record to the first delta record prepended to the prior object state of the object, the second delta record indicating a second object modification associated with the obtained second request; and
initiating installation of a second state change associated with the second object modification via a second atomic operation on the mapping table entry that indicates the first state change.

13. The method of claim 12, further comprising:
initiating a consolidation of the object with the first and second delta records, based on generating a second object, based on updating the object via the first and second object modifications; and
initiating installation of a third state change associated with the object based on initiating a third atomic operation on the mapping table entry that indicates the second state change, installing the physical address of the second object therein.

14. The method of claim 7, further comprising:
determining that a size of a page associated with the latch-free B-tree structure exceeds a predetermined maximal value threshold; and
initiating a split of at least one node of the latch-free B-tree structure that is associated with the page, wherein initiating the split of the at least one node includes:
initiating a prepending of a split delta record to the node, wherein the split delta record includes a separator key value and a logical address corresponding to a side pointer associated with a sibling node that includes node data from the split node, and
initiating a prepending of an index term delta record to a parent node of the node, wherein the index term delta record includes a logical address corresponding to a pointer to the node, the separator key value, and a logical address corresponding to a pointer to the sibling node.

15. The method of claim 7, further comprising:
determining that a size of a page associated with the latch-free B-tree structure is smaller than a predetermined low value threshold; and
initiating a merge of a node of the latch-free B-tree structure that is associated with the page, wherein initiating the merge of the node includes:
initiating a prepending of a remove node delta record to the node, wherein the remove node delta record indicates a removal of the node,
initiating a prepending of a node merge delta record to a left sibling node of the node, wherein the node merge delta record includes a physical address of the contents of the node, and
initiating a prepending of an index term delete delta record to a parent node of the node, wherein the index term delete delta record indicates a deletion of the node and an indication that the left sibling node of the node includes a key space of the node.

16. A method comprising:
determining that a size of a page associated with a latch-free B-tree structure that is updated via latch-free updates, is unacceptable; and initiating via a hardware device processor a modification of a node of the latch-free B-tree structure that is associated with the page, based on:
    initiating a prepending of a delta record to the node, the delta record including an indication of the modification and a physical address pointer to the node, and
    initiating at least one atomic operation to update an indirect address table to replace the physical address of the node with a physical address of the delta record, the indirect address table including logical page identifiers and corresponding physical addresses of physical pages associated with the logical page identifiers.

17. The method of claim 16, wherein: a process that initiates the modification of the node is registered in a start epoch structure on entry to current processing of the latch-free B-tree, and is removed from registration in the start epoch structure on completion of current processing of the latch-free B-tree that is associated with the process.

18. The method of claim 16, wherein:
a process initiates the modification of the node, and
if a second process encounters a partially completed multi-atomic action modification to the latch-free B-tree structure, the second process initiates completion of a remainder of actions for completion of the multi-atomic action modification, based on information obtained from prior modification actions by one or more other process actions.

19. The method of claim 16, wherein:
the modification of the node includes a node split, wherein
initiating the prepending of the delta record to the node includes initiating a prepending of a split delta record to the node, wherein the split delta record includes a separator key value and a logical address corresponding to a side pointer associated with a sibling node that includes node data from the split node, and
initiating a prepending of an index term delta record to a parent node of the node, wherein the index term delta record includes a logical address corresponding to a pointer to the node, the separator key value, and a logical address corresponding to a pointer to the sibling node.

20. The method of claim 16, wherein:
the modification of the node includes a node merge, wherein initiating the prepending of the delta record to the node includes:
initiating a prepending of a remove node delta record to the node, wherein the remove node delta record indicates a removal of the node,
initiating a prepending of a node merge delta record to a left sibling node of the node, wherein the node merge delta record includes a physical address of the contents of the node, and
initiating a prepending of an index term delete delta record to a parent node of the node, wherein the index term delete delta record indicates a deletion of the node and an indication that the left sibling node of the node includes a key space of the node.

\* \* \* \* \*